US012311759B1

(12) United States Patent
Simons et al.

(10) Patent No.: US 12,311,759 B1
(45) Date of Patent: May 27, 2025

(54) WIRELESS VEHICLE INTERFACE FOR IMMOBILIZATION SYSTEM

(71) Applicant: Consumer Safety Technology, LLC, Des Moines, IA (US)

(72) Inventors: Robert Simons, Redondo Beach, CA (US); Stephen Ruiz, Lomita, CA (US)

(73) Assignee: Consumer Safety Technology, LLC, Des Moines, IA (US)

( * ) Notice: Subject to any disclaimer, the term of this patent is extended or adjusted under 35 U.S.C. 154(b) by 190 days.

(21) Appl. No.: 18/104,532

(22) Filed: Feb. 1, 2023

Related U.S. Application Data

(60) Provisional application No. 63/305,950, filed on Feb. 2, 2022.

(51) Int. Cl.

| | |
|---|---|
| ***B60K 28/06*** | (2006.01) |
| *B60Q 1/26* | (2006.01) |
| *B60Q 5/00* | (2006.01) |
| *B60R 25/102* | (2013.01) |

(52) U.S. Cl.

CPC .......... *B60K 28/063* (2013.01); *B60K 28/066* (2013.01); *B60Q 1/26* (2013.01); *B60Q 5/00* (2013.01)

(58) Field of Classification Search

CPC .... B60K 28/063; B60K 28/066; B60K 28/06; B60Q 1/26; B60Q 5/00; B60R 25/102; B60R 25/045

See application file for complete search history.

(56) References Cited

U.S. PATENT DOCUMENTS

| | | | |
|---|---|---|---|
| 3,824,167 | A | 7/1974 | Oswin et al. |
| 3,847,551 | A | 11/1974 | Hutson et al. |
| 3,854,319 | A | 12/1974 | Burroughs et al. |
| 3,877,291 | A | 4/1975 | Hoppesch et al. |
| 3,948,604 | A | 4/1976 | Hoppesch et al. |
| 4,034,743 | A | 7/1977 | Greenwood et al. |
| 4,093,945 | A | 6/1978 | Collier et al. |
| 4,158,198 | A | 6/1979 | Ochiai et al. |

(Continued)

FOREIGN PATENT DOCUMENTS

| | | |
|---|---|---|
| AU | 2001097152 | 6/2002 |
| AU | 2011256122 | 12/2013 |

(Continued)

OTHER PUBLICATIONS

"Accuracy Check Methods Webpage," Intoximeters, Inc., 2013, available as early as Jan. 29, 2013 (1 page).

(Continued)

*Primary Examiner* — Tan Q Nguyen

(74) *Attorney, Agent, or Firm* — Pauly, DeVries Smith & Deffner LLC

(57) ABSTRACT

Embodiments herein relate to a vehicle immobilization system is having a detection unit operable to detect a level of an intoxicant in a user, a control system to receive a signal from the detection unit indicating a level of intoxicant in the user, and a wireless transmitter configured to transmit signals. The system further includes a wireless relay system configured to be disposed in an engine compartment of the vehicle and having a wireless receiver configured to receive the signals from the wireless transmitter. Other embodiments are also included herein.

20 Claims, 12 Drawing Sheets

(56) References Cited

U.S. PATENT DOCUMENTS 4,278,636 A 7/1981 Boldt et al.
4,407,152 A 10/1983 Guth et al.
4,448,058 A 5/1984 Jaffe et al.
4,481,804 A 11/1984 Eberhard et al.
4,487,055 A 12/1984 Wolf et al.
4,592,443 A 6/1986 Simon
4,656,008 A 4/1987 Gump
4,678,057 A 7/1987 Elfman et al.
4,680,956 A 7/1987 Huszczuk
4,697,666 A 10/1987 Collier et al.
4,722,217 A 2/1988 Arnett et al.
4,738,333 A 4/1988 Collier et al.
4,749,553 A 6/1988 Phillips et al.
4,809,810 A 3/1989 Elfman et al.
4,854,153 A 8/1989 Miyagawa et al.
4,901,058 A 2/1990 Comeau et al.
4,902,628 A 2/1990 Blair et al.
4,912,458 A 3/1990 Comeau et al.
4,914,038 A 4/1990 Jewitt et al.
4,926,164 A 5/1990 Breakspere et al.
4,956,561 A 9/1990 Tamer
4,970,172 A 11/1990 Kundu
5,058,601 A 10/1991 Riker
5,069,220 A 12/1991 Casparie et al.
5,134,875 A 8/1992 Jensen et al.
5,239,492 A 8/1993 Hartwig et al.
5,303,575 A 4/1994 Brown et al.
5,303,712 A 4/1994 Van
5,393,495 A 2/1995 Forrester et al.
5,400,637 A 3/1995 Forrester et al.
5,422,485 A 6/1995 Bowlds
5,426,415 A 6/1995 Prachar et al.
5,443,794 A 8/1995 Williams
5,455,734 A 10/1995 Foreman et al.
5,493,891 A 2/1996 Slemeyer
5,568,348 A 10/1996 Foreman et al.
5,622,164 A 4/1997 Kilis et al.
5,665,894 A 9/1997 Baker
5,677,663 A 10/1997 Sansome
5,705,735 A 1/1998 Acorn
5,734,090 A 3/1998 Koppel et al.
5,866,794 A 2/1999 Stock
6,026,674 A 2/2000 Gammenthaler et al.
6,040,638 A * 3/2000 Howell .................. B60R 25/04 70/237
6,075,444 A 6/2000 Sohege et al.
6,079,251 A 6/2000 Gaultier et al.
6,096,558 A 8/2000 Stock et al.
6,167,746 B1 1/2001 Gammenthaler
6,174,289 B1 1/2001 Binder
6,206,130 B1 3/2001 Hetler et al.
6,206,837 B1 3/2001 Brugnoli
6,229,908 B1 5/2001 Edmonds et al.
6,244,093 B1 6/2001 Parekh
6,313,791 B1 11/2001 Klanke et al.
6,358,384 B1 3/2002 Warburton et al.
6,405,728 B1 6/2002 Van Hall et al.
6,418,533 B2 7/2002 Angelo et al.
6,442,639 B1 8/2002 McElhattan et al.
6,445,178 B1 9/2002 Hoekstra et al.
6,475,158 B1 11/2002 Orr et al.
6,526,802 B1 3/2003 Fisher et al.
6,611,201 B1 8/2003 Bishop et al.
6,656,127 B1 12/2003 Ben-Oren et al.
6,664,888 B1 12/2003 Bishop et al.
6,697,732 B1 2/2004 Gotfried et al.
6,726,636 B2 4/2004 Der et al.
6,748,792 B1 6/2004 Freund et al.
6,784,567 B1 8/2004 Klitzner
6,792,793 B2 9/2004 Mendoza et al.
6,824,520 B2 11/2004 Orr et al.
6,853,956 B2 2/2005 Ballard et al.
6,870,475 B2 3/2005 Fitch et al.
6,918,281 B2 7/2005 Sussman et al.
6,956,484 B2 10/2005 Crespo et al.
6,962,153 B2 11/2005 Gershteyn et al.
6,967,581 B2 11/2005 Karsten
6,980,124 B2 12/2005 Kong et al.
7,061,137 B2 6/2006 Flick et al.
7,103,454 B2 9/2006 Stock et al.
7,132,659 B2 11/2006 Starta et al.
7,132,762 B2 11/2006 Metlitzky et al.
7,132,788 B2 11/2006 Gupta et al.
7,135,788 B2 11/2006 Metlitzky et al.
7,171,842 B2 2/2007 Stock et al.
7,204,335 B2 4/2007 Stewart et al.
7,218,236 B2 5/2007 McMillin et al.
7,222,006 B2 5/2007 Proefke et al.
7,256,700 B1 8/2007 Ruocco et al.
7,260,976 B2 8/2007 Colman et al.
7,287,617 B2 10/2007 Mobley et al.
7,299,890 B2 11/2007 Mobley et al.
7,329,390 B2 2/2008 Chrzan et al.
7,341,693 B2 3/2008 Der et al.
7,351,954 B2 4/2008 Zhang et al.
7,359,773 B2 4/2008 Simon et al.
7,377,147 B1 5/2008 Scheffler et al.
7,377,352 B2 5/2008 Mobley et al.
7,400,258 B2 7/2008 Crespo et al.
7,401,493 B2 7/2008 Forrest
7,404,311 B2 7/2008 Guth et al.
7,413,047 B2 8/2008 Brown et al.
7,422,723 B1 9/2008 Betsill et al.
7,451,852 B2 11/2008 Stewart et al.
7,481,292 B2 1/2009 Mobley et al.
7,483,805 B2 1/2009 Sparks et al.
7,493,792 B2 2/2009 Bouchoux et al.
7,493,793 B2 2/2009 Guth et al.
7,519,326 B2 4/2009 Thomas et al.
7,530,851 B2 5/2009 Parnis et al.
7,541,192 B2 6/2009 Stock
7,543,472 B2 6/2009 Crespo et al.
7,547,997 B1 6/2009 Simunek et al.
7,570,172 B2 8/2009 Kamiki
7,603,887 B2 10/2009 Schlichte et al.
7,658,255 B2 2/2010 Nordin
7,743,647 B1 6/2010 Israel et al.
7,797,982 B2 9/2010 Burke et al.
7,823,681 B2 11/2010 Crespo et al.
7,841,224 B2 11/2010 Son
7,860,677 B2 12/2010 Artiuch
7,895,878 B1 3/2011 Guth et al.
7,934,577 B2 5/2011 DeVries et al.
8,001,825 B2 8/2011 Pugh et al.
8,059,003 B2 11/2011 Roth
8,078,334 B2 12/2011 Goodrich
8,197,417 B2 6/2012 Howard et al.
8,224,608 B1 7/2012 Son et al.
8,240,419 B2 8/2012 Zimmermann et al.
8,250,900 B2 8/2012 Son
8,267,215 B2 9/2012 Ozaki
8,311,858 B2 11/2012 McMillan et al.
8,317,998 B2 11/2012 Pratt et al.
8,326,484 B2 12/2012 McGarry et al.
8,359,901 B2 1/2013 Freund et al.
8,364,431 B2 1/2013 Russell et al.
8,418,523 B2 4/2013 Lueck et al.
8,505,360 B2 8/2013 Ruocco et al.
8,515,704 B2 8/2013 Son et al.
8,667,829 B2 3/2014 Guth et al.
8,676,439 B2 3/2014 Huang et al.
8,688,073 B2 4/2014 Peisa et al.
8,701,815 B2 4/2014 Polzius et al.
8,713,985 B2 5/2014 Lueck et al.
8,718,536 B2 5/2014 Hannon
8,755,944 B2 6/2014 Elliott et al.
D708,757 S 7/2014 Shibata
8,795,187 B2 8/2014 Morley et al.
8,800,708 B2 8/2014 Morley et al.
8,822,929 B2 9/2014 Nesa et al.
8,918,251 B2 12/2014 Tarnutzer et al.
8,957,771 B2 2/2015 Arringdale et al.
9,020,773 B2 4/2015 Son et al.
9,026,267 B2 5/2015 Macheca et al.

(56) References Cited

U.S. PATENT DOCUMENTS 9,103,818 B2 8/2015 Son
9,128,067 B2 9/2015 Ostermann et al.
9,128,137 B2 9/2015 Troxler et al.
9,129,336 B2 9/2015 Ehrman et al.
9,140,685 B2 9/2015 Christman et al.
9,165,131 B1 10/2015 Kowalick
9,196,441 B2 11/2015 Wilson
9,207,223 B2 12/2015 Arias et al.
9,221,339 B2 12/2015 Comeau
9,227,512 B2 1/2016 Comeau et al.
9,238,467 B1 1/2016 Lambert et al.
9,260,012 B2 2/2016 Lopez et al.
9,261,885 B2 2/2016 Tryfonos et al.
9,272,713 B1 3/2016 Dvoskin
9,278,696 B2 3/2016 Yi et al.
9,290,095 B2 3/2016 Roth et al.
9,290,174 B1 3/2016 Zagorski et al.
9,296,298 B2 3/2016 Williams et al.
9,308,892 B2 4/2016 Schwarz et al.
9,311,758 B2 4/2016 Choi
9,318,287 B2 4/2016 Saito et al.
9,324,224 B2 4/2016 Schumacher
9,326,713 B2 5/2016 Bellehumeur et al.
9,354,010 B1 5/2016 McCulloch
9,371,056 B2 6/2016 Lunstedt et al.
9,376,017 B2 6/2016 Bailey et al.
9,417,232 B2 8/2016 Keays et al.
9,442,103 B1 9/2016 Goad
9,475,387 B2 10/2016 Wu et al.
9,475,459 B2 10/2016 Tieman
9,481,245 B2 11/2016 Nelson et al.
9,488,672 B2 11/2016 Macdonald
9,496,108 B2 11/2016 Kawamura
9,516,776 B2 12/2016 Kawamura
9,518,966 B2 12/2016 Duric et al.
9,552,681 B2 1/2017 Burger et al.
9,562,883 B2 2/2017 Silverman et al.
9,562,889 B2 2/2017 Son et al.
9,562,890 B2 2/2017 Son
9,630,497 B2 4/2017 Quix et al.
9,662,976 B2 5/2017 Comeau et al.
9,746,456 B2 8/2017 Keays et al.
9,770,984 B2 9/2017 Comeau et al.
9,772,318 B1 9/2017 Lyon
9,784,755 B2 10/2017 Scheffler et al.
9,908,488 B2 3/2018 Shafer
10,040,349 B2 8/2018 DeVries et al.
10,596,903 B2 3/2020 DeVries et al.
10,604,011 B2 3/2020 DeVries et al.
10,919,389 B2 2/2021 DeVries et al.
RE49,381 E * 1/2023 Shafer ................. B60R 16/0231
2001/0037070 A1 11/2001 Cranley et al.
2001/0040503 A1 11/2001 Bishop et al.
2002/0127145 A1 9/2002 Der Ghazarian et al.
2002/0128769 A1 9/2002 Der et al.
2003/0000281 A1 1/2003 Ketler et al.
2003/0117287 A1 6/2003 Crespo et al.
2003/0167821 A1 9/2003 Sussman et al.
2003/0176803 A1 9/2003 Gollar et al.
2003/0216660 A1 11/2003 Ben-Oren et al.
2004/0055359 A1 3/2004 Ketler et al.
2004/0074279 A1 4/2004 Forrest
2004/0075538 A1 4/2004 Flick et al.
2004/0085211 A1 5/2004 Gotfried et al.
2004/0222700 A1 11/2004 Metlitzky et al.
2004/0239510 A1 12/2004 Karsten et al.
2005/0000981 A1 1/2005 Peng et al.
2005/0031483 A1 2/2005 Liu et al.
2005/0033483 A1 2/2005 Simon et al.
2005/0148828 A1 7/2005 Lindsay et al.
2005/0214169 A1 9/2005 Leddy et al.
2005/0273016 A1 12/2005 Colman et al.
2006/0081033 A1 4/2006 Peng
2006/0130557 A1 6/2006 Leddy et al.
2006/0156789 A1 7/2006 Frank et al.
2006/0237253 A1 10/2006 Mobley et al.
2006/0238362 A1 10/2006 Mobley et al.
2006/0239856 A1 10/2006 Mobley et al.
2006/0263254 A1 11/2006 Lee
2007/0044534 A1 3/2007 Forrest et al.
2007/0062249 A1 3/2007 Forrest
2007/0144812 A1 6/2007 Stewart et al.
2007/0239992 A1 10/2007 White et al.
2008/0106390 A1 5/2008 White et al.
2008/0154535 A1 6/2008 Sparks et al.
2008/0221743 A1 9/2008 Schwarz et al.
2008/0227466 A1 9/2008 Rabanne et al.
2009/0004054 A1 1/2009 Burke et al.
2009/0056408 A1 3/2009 Tryfonos et al.
2009/0153296 A1 6/2009 LeGasse et al.
2009/0205407 A1 8/2009 Marhefka et al.
2009/0227887 A1 9/2009 Howard et al.
2009/0293589 A1 12/2009 Freund et al.
2010/0012417 A1 1/2010 Walter et al.
2010/0042333 A1 2/2010 Scheffler et al.
2010/0223975 A1 9/2010 Lueck et al.
2010/0314190 A1 12/2010 Zimmermann et al.
2011/0084820 A1 4/2011 Walter et al.
2011/0111700 A1 5/2011 Hackett
2011/0178420 A1 7/2011 Ridder et al.
2011/0283770 A1 11/2011 Hok et al.
2011/0292209 A1 12/2011 Morley et al.
2011/0309932 A1 12/2011 Arringdale et al.
2012/0025987 A1 2/2012 Mostov et al.
2012/0050046 A1 3/2012 Satorius et al.
2012/0125076 A1 5/2012 Tryfonos et al.
2012/0209634 A1 8/2012 Ling et al.
2012/0291517 A1 11/2012 Son et al.
2012/0295456 A1 11/2012 Severac et al.
2012/0306618 A1 12/2012 Tieman et al.
2013/0074575 A1 3/2013 Duric et al.
2013/0155641 A1 6/2013 Profeta et al.
2013/0158838 A1 6/2013 Yorke et al.
2013/0203365 A1 8/2013 Tieman et al.
2013/0238199 A1 9/2013 Williams et al.
2013/0281873 A1 10/2013 Evans et al.
2013/0325204 A1 * 12/2013 Bald ..................... B60K 28/04 701/1
2013/0325924 A1 12/2013 Moshfeghi
2013/0338880 A1 12/2013 Connerty et al.
2014/0041436 A1 2/2014 Knott et al.
2014/0048040 A1 2/2014 Rivet et al.
2014/0049381 A1 2/2014 Moon et al.
2014/0061043 A1 3/2014 Stock et al.
2014/0062722 A1 3/2014 Ofir et al.
2014/0076022 A1 3/2014 Ohlsson et al.
2014/0156111 A1 6/2014 Ehrman et al.
2014/0172467 A1 6/2014 He et al.
2014/0180500 A1 6/2014 Hannon et al.
2014/0229061 A1 8/2014 Tarnutzer et al.
2014/0230518 A1 8/2014 Lueck et al.
2014/0311214 A1 10/2014 Wolf et al.
2014/0358020 A1 12/2014 Park et al.
2015/0008063 A1 1/2015 Walter et al.
2015/0021113 A1 1/2015 Lefebvre et al.
2015/0066238 A1 3/2015 Todd et al.
2015/0066284 A1 3/2015 Yopp
2015/0070340 A1 3/2015 Trachtenberg et al.
2015/0081134 A1 3/2015 Burger
2015/0094080 A1 4/2015 Bleecher Snyder et al.
2015/0160190 A1 6/2015 Ravishankar
2015/0164416 A1 6/2015 Nothacker et al.
2015/0183386 A1 7/2015 Tieman
2015/0187147 A1 7/2015 Tieman
2015/0197151 A1 7/2015 Ballard
2015/0222349 A1 8/2015 Sloan et al.
2015/0228437 A1 8/2015 Didimo et al.
2015/0244452 A1 8/2015 Wojciech et al.
2015/0251660 A1 9/2015 Nelson
2015/0289295 A1 10/2015 Granbery
2015/0297117 A1 10/2015 Park et al.
2015/0365986 A1 12/2015 Lee et al.
2016/0003746 A1 1/2016 McCrary et al.
2016/0016467 A1 1/2016 Mathissen et al.

(56) References Cited

U.S. PATENT DOCUMENTS

| | | | |
|---|---|---|---|
| 2016/0054296 | A1 | 2/2016 | Son |
| 2016/0065298 | A1 | 3/2016 | Nakagawa et al. |
| 2016/0082837 | A1 | 3/2016 | Comeau et al. |
| 2016/0086021 | A1 | 3/2016 | Grohman et al. |
| 2016/0089976 | A1 | 3/2016 | Comeau |
| 2016/0096531 | A1 | 4/2016 | Hoye |
| 2016/0101727 | A1 | 4/2016 | Kwon |
| 2016/0123955 | A1 | 5/2016 | Wolf, Jr. |
| 2016/0137164 | A1 | 5/2016 | Jones |
| 2016/0153963 | A1 | 6/2016 | Keays |
| 2016/0185217 | A1 | 6/2016 | Hannon |
| 2016/0188964 | A1 | 6/2016 | Quddus et al. |
| 2016/0207398 | A1 | 7/2016 | Lopez et al. |
| 2016/0229413 | A1 | 8/2016 | Morley et al. |
| 2016/0240064 | A1 | 8/2016 | Schumacher |
| 2016/0252492 | A1 | 9/2016 | Rarama et al. |
| 2016/0272153 | A1 | 9/2016 | Doi et al. |
| 2016/0272214 | A1 | 9/2016 | Chen |
| 2016/0280230 | A1 | 9/2016 | Hsieh |
| 2016/0288741 | A1 | 10/2016 | Shafer |
| 2016/0303967 | A1 | 10/2016 | Quix et al. |
| 2016/0318521 | A1 | 11/2016 | Nothacker et al. |
| 2016/0327541 | A1 | 11/2016 | Reinstaedtler |
| 2016/0349239 | A1 | 12/2016 | Chien |
| 2016/0358029 | A1 | 12/2016 | Mullin |
| 2016/0377597 | A1 | 12/2016 | Tschuncky et al. |
| 2017/0005718 | A1 | 1/2017 | Sloan et al. |
| 2017/0006151 | A1 | 1/2017 | Doorandish |
| 2017/0035332 | A1 | 2/2017 | Wahnschafft |
| 2017/0036621 | A1 | 2/2017 | Tieman |
| 2017/0050518 | A1 | 2/2017 | Steeg et al. |
| 2017/0050519 | A1 | 2/2017 | Cristofaro |
| 2017/0057353 | A1 | 3/2017 | Griffin |
| 2017/0096145 | A1 | 4/2017 | Bahn |
| 2017/0096146 | A1 | 4/2017 | Jones |
| 2017/0101006 | A1 | 4/2017 | DeVries et al. |
| 2017/0101007 | A1* | 4/2017 | DeVries ................ A61B 5/082 |
| 2017/0104865 | A1 | 4/2017 | Skelton |
| 2017/0131261 | A1 | 5/2017 | Biondo et al. |
| 2017/0156124 | A1 | 6/2017 | Ashley et al. |
| 2017/0176411 | A1 | 6/2017 | Trainor et al. |
| 2017/0282712 | A1 | 10/2017 | DeVries et al. |
| 2017/0282713 | A1 | 10/2017 | DeVries et al. |
| 2017/0316621 | A1 | 11/2017 | Jefferies et al. |
| 2017/0346688 | A1 | 11/2017 | Reddy et al. |
| 2018/0011068 | A1 | 1/2018 | Lyon |
| 2018/0015905 | A1 | 1/2018 | Yorke et al. |
| 2018/0027144 | A1 | 1/2018 | Yokoyama |
| 2018/0074029 | A1 | 3/2018 | DeVries et al. |
| 2018/0074030 | A1 | 3/2018 | DeVries et al. |
| 2018/0091930 | A1 | 3/2018 | Jefferies |
| 2018/0121903 | A1 | 5/2018 | Al Salah |
| 2018/0150061 | A1 | 5/2018 | Yang et al. |
| 2018/0365978 | A1* | 12/2018 | Chen ..................... G08C 17/02 |
| 2019/0072531 | A1 | 3/2019 | DeVries et al. |
| 2019/0076056 | A1 | 3/2019 | Carlson et al. |
| 2019/0092342 | A1 | 3/2019 | Biondo et al. |
| 2019/0126935 | A1 | 5/2019 | Phillips et al. |
| 2019/0135230 | A1 | 5/2019 | Garner et al. |
| 2019/0145956 | A1 | 5/2019 | Lyon |
| 2019/0366845 | A1 | 12/2019 | DeVries et al. |
| 2020/0184745 | A1 | 6/2020 | Merg et al. |
| 2020/0215911 | A1 | 7/2020 | DeVries et al. |
| 2020/0215912 | A1 | 7/2020 | DeVries et al. |
| 2022/0297540 | A1 | 9/2022 | DeVries et al. |
| 2022/0363235 | A1* | 11/2022 | Tessier ................. B60R 25/045 |

FOREIGN PATENT DOCUMENTS

| | | |
|---|---|---|
| CA | 1337463 | 10/1995 |
| CA | 2269546 | 4/1998 |
| CA | 2270809 | 10/1999 |
| CA | 2731040 | 1/2010 |
| CA | 2711410 | 1/2012 |
| CA | 2788785 | 2/2013 |
| CA | 2780135 | 12/2013 |
| CA | 2821197 | 1/2015 |
| CA | 2858708 | 2/2015 |
| CA | 2905093 | 9/2015 |
| CA | 2684266 | 3/2017 |
| CA | 2938417 | 4/2018 |
| CA | 2938407 | 7/2018 |
| CA | 2997483 | 8/2022 |
| CN | 102397616 | 4/2012 |
| CN | 102778541 | 11/2012 |
| CN | 102955472 | 3/2013 |
| CN | 101821120 | 11/2013 |
| CN | 103578853 | 2/2014 |
| CN | 105699296 | 6/2016 |
| DE | 19638971 | 4/1998 |
| DE | 10238094 | 3/2004 |
| DE | 102007029271 | 12/2008 |
| DE | 102013015826 | 3/2015 |
| DE | 102013018663 | 5/2015 |
| DE | 10350178 | 11/2016 |
| DE | 202015009104 | 11/2016 |
| EP | 243470 | 11/1987 |
| EP | 0184917 | 7/1990 |
| EP | 516623 | 8/1995 |
| EP | 1591296 | 11/2005 |
| EP | 1933218 | 6/2008 |
| EP | 1987355 | 2/2012 |
| EP | 2127599 | 3/2012 |
| EP | 2544000 | 1/2013 |
| EP | 2808681 | 12/2014 |
| EP | 2623378 | 7/2015 |
| EP | 2760041 | 9/2015 |
| EP | 2740252 | 4/2016 |
| EP | 3018476 | 5/2016 |
| EP | 2360048 | 9/2016 |
| EP | 2867666 | 10/2016 |
| EP | 2761267 | 11/2016 |
| EP | 3091489 | 11/2016 |
| EP | 3156276 | 4/2017 |
| EP | 3156277 | 4/2017 |
| EP | 3116736 | 7/2019 |
| ES | 2660013 | 3/2018 |
| FR | 2535143 | 4/1984 |
| FR | 3033149 | 9/2016 |
| GB | 2049193 | 12/1980 |
| GB | 2313198 | 11/1997 |
| GB | 2536422 | 9/2016 |
| IN | 201102479 | 12/2011 |
| JP | 5964508 | 8/2016 |
| KR | 20100070199 | 6/2010 |
| KR | 20100072578 | 7/2010 |
| KR | 101059978 | 8/2011 |
| KR | 1020160068277 | 6/2016 |
| KR | 1020160096251 | 8/2016 |
| TW | 565696 | 12/2003 |
| WO | 8702773 | 5/1987 |
| WO | 8702832 | 5/1987 |
| WO | 9212416 | 7/1992 |
| WO | 9422686 | 10/1994 |
| WO | 1994022686 | 10/1994 |
| WO | 9641428 | 12/1996 |
| WO | 9714947 | 4/1997 |
| WO | 1998027416 | 6/1998 |
| WO | 2001075439 | 10/2001 |
| WO | 2001086286 | 11/2001 |
| WO | 0218186 | 3/2002 |
| WO | 2002048705 | 6/2002 |
| WO | 2002085706 | 10/2002 |
| WO | 2005028788 | 3/2005 |
| WO | 2007059263 | 5/2007 |
| WO | 2007094712 | 8/2007 |
| WO | 2008073029 | 6/2008 |
| WO | 2009067064 | 5/2009 |
| WO | 2009111484 | 9/2009 |
| WO | 2009155048 | 12/2009 |
| WO | 2010009406 | 4/2010 |
| WO | 2010086557 | 8/2010 |
| WO | 2010093317 | 8/2010 |
| WO | 2010094967 | 8/2010 |

(56) References Cited

FOREIGN PATENT DOCUMENTS

| | | |
|---|---|---|
| WO | 2010025478 | 3/2011 |
| WO | 2011143693 | 11/2011 |
| WO | 2012041505 | 4/2012 |
| WO | 2012122385 | 12/2012 |
| WO | 2013001265 | 1/2013 |
| WO | 2013023032 | 2/2013 |
| WO | 2013033099 | 3/2013 |
| WO | 2013051992 | 4/2013 |
| WO | 2013134460 | 9/2013 |
| WO | 2013191634 | 12/2013 |
| WO | 2014036088 | 3/2014 |
| WO | 2014134252 | 9/2014 |
| WO | 2015100166 | 7/2015 |
| WO | 2015116821 | 8/2015 |
| WO | 2015126867 | 8/2015 |
| WO | 2016009058 | 1/2016 |
| WO | 2016044926 | 3/2016 |
| WO | 2016081905 | 5/2016 |
| WO | 2016092796 | 6/2016 |
| WO | 2016113353 | 7/2016 |
| WO | 2016137246 | 9/2016 |
| WO | 2016144738 | 9/2016 |
| WO | 2016170534 | 10/2016 |
| WO | 2016187243 | 11/2016 |
| WO | 2016193519 | 12/2016 |
| WO | 2017041482 | 3/2017 |
| WO | 2017064023 | 4/2017 |

OTHER PUBLICATIONS

"ACS Alcosim Calibration Bench Multi Stage Breath Alcohol Simulator," https://acs-corp.com/image/brochures/20171208-BRO-ACS-CA-ENG-A5-ALCOSIMCalibrationBench-WEB.pdf, Dec. 8, 2017, 2 pages.

"ACS Metrological Test Bench Multi Stage Breath Alcohol Simulator," https://acs-corp.com/image/brochures/20180129-BRO-ACS-CA-ENG-A5-MetrologicalTestBench-WEB.pdf, Jan. 29, 2018, 2 pages.

"Alcolizer LE Main Web Page," Alcolizer Pty Ltd, www.alcolizer.com, available as early as Mar. 20, 2012 (2 pages).

"Alcolizer Re-Calibration Web Page," Alcolizer Pty Ltd, www.alcolizer.com/products/re-calibration, available as early as Mar. 20, 2012 (2 pages).

"Alcolizer Technology Industry Welcome to the AOD Industry Presentation," http://transafewa.com.au/wp-content/uploads/2014/11/Alcolizer-Technology-Industry-Presentation-JY-1509.pdf, available at least as early as Mar. 20, 2015, 20 pages.

"Alcolizer Wall Mount Product Page," Alcolizer Pty Ltd, www.alcolizer.com/products/alcolizer-wm-wall-mount-series, available as early as Mar. 20, 2012 (2 pages).

"Alco-Sensor FST Operators Manual," Intoximeters, Inc., printed Jun. 2007 (37 pages).

"Alco-Sensor FST(R) Product Webpage," Intoximeters, Inc., available as early as Dec. 2, 2011 (2 pages).

"Alert J4X.ec Breath Alcohol Tester User Guide," Alcohol Countermeasure Systems, 2008 (36 pages).

"ATD Tools 5614 Relay Circuit Tester," Product for sale on Amazon as early as Aug. 22, 2013 (7 pages).

"AutoRAE 2 Automatic Test and Calibration System Datasheet," RAE Systems, Inc., DS-1083-02, date unavailable (2 pages).

"AutoRAE 2 Automatic Test and Calibration System User's Guide," RAE Systems by Honeywell, Rev. E, Apr. 2014 (118 pages).

"AutoRAE Lite for QRAE II User's Guide," Rae Systems by Honeywell, Rev. A. Jun. 2009 (55 pages).

"Benefits of Alcosystems iBAC Solution," iBac Alcosystems AB, available online as early as Jan. 11, 2012 (2 pages).

"Bid Specifications: Galaxy(TM) Automated Test System," Mine Safety Appliances Company, available as early as Jul. 11, 2012 (4 pages).

"Breath Alcohol Testing Calibration Equipment Webpage," Intoximeters, Inc., www.intox.com/c-18-calibration.aspx, available as early as Feb. 13, 2012 (2 pages).

"Calibration Device and Method for Calibrating an Ignition Interlock Device," U.S. Appl. No. 14/706,402, filed May 7, 2015 (36 pages).

"Calibration Station for the Ventis™ MX4: Product Manual," Industrial Scientific Corporation, 2010 (40 pages).

"Calibration Station or Docking Station: Which one do you need for your gas detectors?," Industrial Scientific Corporation, 2015 (8 pages).

"Communication Pursuant to Article 94(3) EPC," for European Patent Application No. 16183848.7 mailed May 6, 2019 (6 pages).

"Communication Pursuant to Article 94(3) EPC," for European Patent Application No. 16183858.6 mailed May 10, 2019 (6 pages).

"Description of Calibration Kiosk used for Intoxalock Breath Alcohol Detectors," Intoxalock Description, as early as Jan. 2011, 4 pages.

"Draeger Gas Detection Product Brochure," Draeger Safety, Inc, 2009 (50 pages).

"Draeger Interlock(R) XT Product Webpage," Draeger Safety, Inc, www.draeger.us/sites/enus_us/Pages/Law-Enforcement/INTERLOCK-XT.aspx?navID=173, available as early as Apr. 26, 2012 (2 pages).

"Draeger Introduces X-Dock, a Test and Calibration Station for Portable Gas Detection," Press Release, Draeger Safety, Inc., Apr. 23, 2013 (2 pages).

"Draeger Product Selector Webpage," Draeger Safety, Inc, http://www.draeger.us/sites/enus_us/Pages/LawEnforcement/ProductSelector.aspx?navID=159, available as early as Apr. 26, 2012 (2 pages).

"Draeger X-am 2500 Technical Manual," Draeger Safety, Inc, Nov. 2012 (36 pages).

"Draeger X-dock 5300, 6300/6600 Technical Manual," Draeger Safety, Inc., Aug. 2013 (28 pages).

"Draeger X-Dock 5300/6300/6600 Product Brochure," Draeger Safety, Inc, 2012 (5 pages).

"Dry Gas Standard Webpage," Intoximeters, Inc., www.intox.com/t-DryGasStandard.aspx, available as early as Jan. 29, 2013 (2 pages).

"DS2: Administrator's Guide to the DS2 Docking Station," Industrial Scientific Corporation, Nov. 11, 2008 (261 pages).

"EESR Response," for European Patent Application No. 16183848.7 filed with the EPO Oct. 16, 2017 (24 pages).

"Examiner's Report," for Canadian Patent Application No. 2,938,407 mailed Sep. 20, 2017 (3 pages).

"Examiner's Report," for Canadian Patent Application No. 2,938,417 mailed Jul. 12, 2017 (4 pages).

"Extended European Search Report," for European Patent Application No. 16183848.7 mailed Mar. 14, 2017 (10 pages).

"Extended European Search Report," for European Patent Application No. 16183858.6 mailed Mar. 14, 2017 (9 pages).

"Final Office Action," for U.S. Appl. No. 13/221,995, mailed Jan. 21, 2014 (12 pages).

"Final Office Action," for U.S. Appl. No. 15/223,894 mailed Mar. 1, 2018 (16 pages).

"Final Office Action," for U.S. Appl. No. 15/223,921 mailed Dec. 18, 2018 (16 pages).

"Final Office Action," for U.S. Appl. No. 15/261,231 mailed Jan. 14, 2019 (10 pages).

"Final Office Action," for U.S. Appl. No. 15/261,253 mailed Mar. 7, 2019 (17 pages).

"Final Office Action," for U.S. Appl. No. 15/621,507 mailed Feb. 7, 2018 (30 pages).

"First Examination Report," for Australian Patent Application No. 2016216531 mailed Aug. 7, 2020 (4 pages).

"First Examination Report," for Australian Patent Application No. 2021201884 mailed Jul. 21, 2022 (3 pages).

"Galaxy (R) GX2 Automated Test System Quick Start Guide—Description and Setup," Mine Safety Appliances Company, Sep. 2012 (10 pages).

"Galaxy GX2 Automated Test System Frequently Asked Questions," Mine Safety Appliances Company, Published Aug. 2012 (1 page).

(56) References Cited

OTHER PUBLICATIONS

"Galaxy(R) Automated Test System Operating Manual," Mine Safety Appliances Company 2008, available online as early as Jul. 11, 2012 (124 pages).
"Galaxy(R) Automated Test System Product Brochure," Mine Safety Appliances Company, Sep. 2011 (4 pages).
"Galaxy(R) GX2—Simplicity Counts," Product Brochure, Mine Safety Appliances, Aug. 2012 (2 pages).
"Galaxy(R) GX2 Automated Test System Datasheet," Mine Safety Appliances Company, published Aug. 2012 (6 pages).
"Galaxy(R) GX2 Automated Test System Operating Manual," Mine Safety Appliances Company 2012 (72 pages).
"Galaxy(R) Network Interface and Network Manager Instruction Manual," Mine Safety Appliances Company 2010, available online as early as Jul. 11, 2012 (69 pages).
"Guardian Interlock Product WR3 Calibration Station," https://www.guardianinterlock.com.au/product/wr3-calibration-station, Available at least as early as Mar. 11, 2015, 3 pages.
"Highway Safety Programs; Conforming Products List of Calibrating Units for Breath Alcohol Testers," Department of Transportation National Highway Traffic Safety Administration. Federal Register / vol. 77, No. 204 / Monday, Oct. 22, 2012 (3 pages).
"Highway Safety Programs; Model Specifications for Calibrating Units for Breath Alcohol Testers; Conforming Products List of Calibrating Units for Breath Alcohol Testers," Federal Register, vol. 72, No. 121 (Jun. 25, 2007) (7 pages).
"Highway Safety Programs; Model Specifications for Calibrating Units for Breath Alcohol Testers; Conforming Products List of Calibrating Units," Federal Register, vol. 62, No. 156 (Aug. 13, 1997) (10 pages).
"Honeywell Biosystems Toxi IQ Express Docking Station ToxiPro Single Gas Detectors," https://www.brandtinst.com/biosystems/detector/IQExpress/index.html, available at least as early as Jan. 20, 2008, 3 pages.
"Honeywell IQ Management System," https://www.honeywellanalytics.com/en/products/IQ-Management-System, available at least as early as Oct. 18, 2014, 3 pages.
"IBAC Product Brochure," iBac Alcosystems AB, 2011 (6 pages).
"Interlock Help Webpage," Alcohol Countermeasure Systems (International), Inc., www.interlockhelp.com, available as early as Dec. 27, 2011 (1 page).
"Intox DMT Product Brochure," Intoximeters, Inc., printed May 2019 (2 pages).
"Intox EC/IR II Training Materials, Feb. 22-25, 2010," Intoximeters Inc., Jun. 29, 2009, pp. 1-240.
"Intox EC/IR(R) II Webpage," Intoximeters, Inc., www.intox.com/p-562-intox-ecir-ii.aspx, available as early as Sep. 21, 2011 (1 page).
"Intoxilyzer 8000 Reference Guide," Florida Department of Law Enforcement Alcohol Testing Program, Feb. 2006 (14 pages).
"Intoxilyzer 9000 Brochure," CMI, Inc., available at least as early as Feb. 1, 2015 as shown on the Way Back Machine available online., 2 pages.
"LifeSafer Ignition Interlock Webpage," LifeSafer, www.lifesafer.com/, available as early as Jul. 19, 2012 (3 pages).
"Lion Alcometer(R) 500 User Handbook," Lion Laboratories Limited, 2011 (54 pages).
"Method for Calibrating an Ignition Interlock Device," U.S. Appl. No. 14/036,343, filed Sep. 25, 2013 (31 pages).
"MicroDock II Automatic Test and Calibration Station User Manual," BW Technologies by Honeywell, 2009 (101 pages).
"Nilight—50040R 12V Car Add-a-Circuit Fuse Adapter with Standard and Mini TAP Profile TAP Blade Fust for Cars Trucks Boats, 10 Pack Fuse Holder," Product available for sale on Amazon as early as Jun. 22, 2019 (9 pages).
"Non-Final Office Action," for U.S. Appl. No. 13/221,995, mailed Jun. 12, 2014 (11 pages).
"Non-Final Office Action," for U.S. Appl. No. 13/221,995, mailed Oct. 9, 2013 (11 pages).
"Non-Final Office Action," for U.S. Appl. No. 15/223,894 mailed Jul. 28, 2017 (17 pages).
"Non-Final Office Action," for U.S. Appl. No. 15/223,921 mailed Apr. 12, 2018 (17 pages).
"Non-Final Office Action," for U.S. Appl. No. 15/223,921 mailed Aug. 2, 2018 (33 pages).
"Non-Final Office Action," for U.S. Appl. No. 15/223,921 mailed May 22, 2019 (10 pages).
"Non-Final Office Action," for U.S. Appl. No. 15/261,231 mailed Jul. 8, 2019 (8 pages).
"Non-Final Office Action," for U.S. Appl. No. 15/261,231 mailed Sep. 14, 2018 (21 pages).
"Non-Final Office Action," for U.S. Appl. No. 15/261,253 mailed Aug. 9, 2018 (27 pages).
"Non-Final Office Action," for U.S. Appl. No. 15/621,507 mailed Jul. 28, 2017 (14 pages).
"Non-Final Office Action," for U.S. Appl. No. 15/622,309 mailed Aug. 7, 2017 (8 pages).
"Non-Final Office Action," for U.S. Appl. No. 15/622,309 mailed Dec. 18, 2017 (15 pages).
"Non-Final Office Action," for U.S. Appl. No. 15/622,309 mailed May 10, 2018 (11 pages).
"Non-Final Office Action," for U.S. Appl. No. 15/622,309 mailed Nov. 13, 2018 (15 pages).
"Non-Final Office Action," for U.S. Appl. No. 16/821,552 mailed Apr. 28, 2020 (6 pages).
"Non-Final Office Action," for U.S. Appl. No. 16/821,552 mailed Jul. 28, 2020 (44 pages).
"Notice of Allowance," for U.S. Appl. No. 13/221,995, mailed Oct. 7, 2014 (9 pages).
"Notice of Allowance," for U.S. Appl. No. 15/223,921 mailed Nov. 19, 2019 (30 pages).
"Notice of Allowance," for U.S. Appl. No. 15/223,921 mailed Oct. 7, 2019 (11 pages).
"Notice of Allowance," for U.S. Appl. No. 15/621,507 mailed Apr. 17, 2018 (11 pages).
"Notice of Allowance," for U.S. Appl. No. 16/543,274 mailed Sep. 24, 2019 (8 pages).
"Office Action," for Canadian Patent Application No. 2,997,483 mailed Sep. 8, 2021 (7 pages).
"Office Action," for Canadian Patent Application No. 3,006,480 mailed Oct. 31, 2022 (3 pages).
"Operating the DataMaster DMT," Version 1.0, Division of Criminal Investigation, Alcohol Section, Jul. 2009 (163 pages).
"QIACHIP 433Mhz Universal Wireless Remote Control Switch AC 85V~ 250V 110V 220V 1 Channel Relay Receiver Module and RF 433 Mhz Remote Controls KR2201-4/KT05," Quiachip product for sale at URL <https://qiachip.com/products/433mhz-universal-wireless-remote-control-channel-relay-switch-110v-220v > 2021 (13 pages).
"Response to Communication Pursuant to Article 94(3) EPC," for European Patent Application No. 16183848.7 filed Nov. 14, 2019 (13 pages).
"Response to Examination Report," for Australian Patent Application No. 2021201884 filed Jan. 24, 2023 (71 pages).
"Response to Examiner's Report," for Canadian Patent Application No. 2,938,407 filed with CIPO Dec. 19, 2017 (6 pages).
"Response to Examiner's Report," for Canadian Patent Application No. 2,938,417 filed with CIPO Aug. 24, 2017 (4 pages).
"Response to Extended European Search Report," for European Patent Application No. 16183858.6 filed with the EPO Oct. 12, 2017 (23 pages).
"Response to Final Office Action," for U.S. Appl. No. 15/223,894, filed on May 1, 2018 (13 pages).
"Response to Final Office Action," for U.S. Appl. No. 15/223,921, filed on Mar. 18, 2019 (10 pages).
"Response to Final Office Action," for U.S. Appl. No. 15/261,231, filed on Jun. 14, 2019 (9 pages).
"Response to Final Office Action," for U.S. Appl. No. 15/261,253, filed on Sep. 9, 2019 (14 pages).
"Response to Final Office Action," for U.S. Appl. No. 15/621,507, filed on Mar. 22, 2018 (10 pages).
"Response to Non Final Office Action," for U.S. Appl. No. 15/223,921, filed on Nov. 1, 2018, 2018 (12 pages).

(56) References Cited

OTHER PUBLICATIONS

"Response to Non Final Office Action," for U.S. Appl. No. 15/223,921, filed on Sep. 23, 2019 (12 pages).
"Response to Non Final Office Action," for U.S. Appl. No. 15/261,231, filed on Nov. 7, 2018 (11 pages).
"Response to Non Final Office Action," for U.S. Appl. No. 15/261,253, filed Nov. 2, 2018 (10 pages).
"Response to Non Final Office Action," for U.S. Appl. No. 15/622,309, filed Mar. 15, 2018 (15 pages).
"Response to Non Final Office Action," for U.S. Appl. No. 15/622,309, filed Sep. 10, 2018 (10 pages).
"Response to Non Final Office Action," for U.S. Appl. No. 16/821,552, filed Jul. 15, 2020 (7 pages).
"Response to Non Final Office Action," for U.S. Appl. No. 16/821,552, filed Oct. 12, 2020 (9 pages).
"Response to Non-Final Office Action," for U.S. Appl. No. 15/223,921, filed Jun. 18, 2018 (11 pages).
"Response to Non-Final Office Action," for U.S. Appl. No. 15/621,507, filed Oct. 27, 2017, 19 pages.
"Response to Non-Final Office Action," for U.S. Appl. No. 15/622,309, filed Nov. 7, 2017, 11 pages.
"Response to Office Action," for Canadian Patent Application No. 2,997,483 filed Dec. 15, 2021 (20 pages).
"Response to Office Action," for Canadian Patent Application No. 3,006,480 filed Jan. 12, 2023 (2 pages).
"RKI Instruments Docking and Calibration Station Gas Detection for Live SDM-E2," https://www.rkiinstruments.com/pdf/sdme2.pdf, available at least as early as Mar. 29, 2014, 2 pages.
"SDM-2012 Docking Station Standalone Configuration Operator's Manual," RKI Instruments, released Aug. 12, 2013 (112 pages).
"Smart Start IN-HOM User Instructions," SmartStartInc.com, Oct. 2009, 2 pages.
"Solaris(R) MultiGas Detector Operating Manual," Mine Safety Appliances Company 2007 (162 pages).
"Summons to Attend Oral Proceedings," for European Patent Application No. 16183848.7 mailed Aug. 5, 2022 (7 pages).
"TIM(R) Total Instrument Manager Instruction Manual," Mine Safety Appliances Company 2002 (87 pages).
"True-Cal II Product Webpage," Intoximeters, Inc., http://www.intox.com/p-723-true-cal-ii.aspx, available as early as Sep. 15, 2013 (1 page).
"TruTouch Technologies FAQ Webpage," TruTouch Technologies Inc., www.tttinc.com/FAQ.php, available as early as Dec. 22, 2012 (4 pages).
"TruTouch Technologies Webpage," TruTouch Technologies Inc., www.tttinc.com, available as early as May 19, 2012 (1 page).
"Where Did the Ignition Interlock Device Come From? A History," https://www.smartstartinc.com/blog/history-ignition-interlock-device/, Aug. 15, 2017, 8 pages.
Response to Non-Final Office Action mailed Jul. 28, 2017, for U.S. Appl. No. 15/223,894, submitted via EFS-Web on Jan. 25, 2018, 11 pages.
Comeau, Felix J. E."Ignition Interlock Devices Support Program Development," Alcohol, Drugs and Traffic Safety—T 2000: Proceedings of the 15th International Conference on Alcohol, Drugs and Traffic Safety, 2000, 5 pages.
Hok, Bertil, et al. "Breath Analyzer for Alcolocks and Screening Devices," IEEE Sensors Journal, vol. 10, No. 1, Jan. 10-15, 2010 (6 pages).
Jonsson, A., et al. "Development of a Breath Alcohol Analyzer for Use on Patients in Emergency Care," Dossel O., Schlegel W.C. (eds) World Congress on Medical Physics and Biomedical Engineering, Sep. 7-12, 2009 (4 pages).
Mayer, R. "Ignition interlock—A toolkit for program administrators, policymakers, and stakeholders," 2nd Edition. Report No. DOT TH 811 883, Feb. 2014, Washington, D.C.: National Highway Traffic Safety Administration (60 pages).
Semedo, Daniela "Rapid Breath Test Patented for Potential Quick Diagnosis of TB and Other Lung Diseases," Lung Disease News, 8 pages.
Van Tassel, William Edward "An Evaluation of Pocket-Model, Numerical Readout Breath Alcohol Testing Instruments," Dissertation Submitted to Texas A&M University, Aug. 2003 (164 pages).
Voyomotive, LLC "What is Voyo?," Product description retrieved on Oct. 9, 2015 from http://voyomotive.com/what-is-voyo/.
Wood, Chris "Breathometer Turns Your Smartphone Into a Breathalyzer," New Atlas, https://newatlas.com/breathometer-smartphone-breathalyzer/26634/, Mar. 13, 2013 (4 pages).

* cited by examiner

WIRELESS VEHICLE INTERFACE FOR IMMOBILIZATION SYSTEM

This application claims the benefit of U.S. Provisional Application No. 63/305,950, filed Feb. 2, 2022, the content of which is herein incorporated by reference in its entirety.

FIELD

Embodiments herein relate generally to vehicle immobilization in response to intoxication of a driver, and more specifically to wireless vehicle intoxication immobilization.

BACKGROUND

Vehicles incorporate breath alcohol ignition interlock devices, sometimes abbreviated as BAIIDs, to prevent a driver with a known history of driving while intoxicated with alcohol from operating the vehicle while intoxicated. Such devices are designed to prevent a driver from starting a motor vehicle when the driver's breath alcohol concentration (BAC) is at or above a set alcohol concentration. Each state in the U.S. has adopted a law providing for use of such BAIID devices as a sanction for drivers convicted of driving while intoxicated, or as a condition of restoring some driving privileges after such offenses. Many other territories and countries around the world have these types of laws.

In operation, a driver uses a BAIID device by blowing into an alcohol-sensing element such as a fuel cell that measures the amount of alcohol in the driver's breath. The BAIID reads a signal from the fuel cell or other alcohol-sensing element and determines whether the driver's blood alcohol content exceeds a threshold amount, based on a known relationship between blood alcohol and breath alcohol. If the driver's determined blood alcohol content does not exceed the threshold, the BAIID allows the vehicle to start and run by electrically enabling a system within the vehicle, such as the starter, fuel pump, ignition, or the like. If the driver's blood alcohol concentration exceeds the threshold, the vehicle is not allowed to start, and the BAIID device records a violation.

In many commercially-available BAIID systems, installation is accomplished by hard-wiring the BAIID system into the car's electrical system, including a connection to disable the vehicle's ignition, and by connecting the BAIID such that it can monitor the car's operation to ensure that unauthorized operation is not taking place. Installation therefore typically involves wiring multiple connections from the BAIID device in the passenger compartment of a car to various electrical systems within the car, such as a starter in the engine compartment, and speed sensor or mileage sensor connections in the car's dashboard. This usually requires removing at least part of the dashboard, routing wires through the firewall into the engine compartment, and connecting wires to various electrical system components in the vehicle's dashboard systems. Installation varies significantly by type of vehicle.

SUMMARY

In a first aspect, a vehicle immobilization system includes a detection unit operable to detect a level of an intoxicant in a user and a control system configured to receive a signal from the detection unit indicating a level of intoxicant in the user. The control system can include a control system housing configured to fit within a passenger compartment of a vehicle, a processor disposed within the control system housing, and a wireless transmitter configured to transmit signals. The vehicle immobilization system can further include a wireless relay system, configured to be disposed in an engine compartment of the vehicle and including a wireless relay housing, a wireless receiver configured to receive the signals from the wireless transmitter, a circuit control relay configured to be electrically connected to a vehicle relay location in an under-hood relay box in the engine compartment of the vehicle, and an interlock control relay configured to be electrically connected to the circuit control relay and the vehicle relay location, where the interlock control relay is configured to selectively allow a function of the vehicle based on the signals received by the wireless receiver.

In a second aspect, in addition to one or more of the preceding or following aspects, or in the alternative to some aspects, the control system can include an ignition input configured to be electrically connected to an ignition harness of the vehicle, where the ignition input is configured to provide an ignition status of the vehicle to the control system, wherein the ignition input can be configured to be operatively connected to the ignition harness with an insulation displacement connector.

In a third aspect, in addition to one or more of the preceding or following aspects, or in the alternative to some aspects, the control system can include a power input, configured to be electrically connected to a constant power source in an in-cabin electrical system of the vehicle, the power input configured to deliver power to the control system from the constant power source, wherein the power input can be configured to be operatively connected to the constant power source with a fuse tap.

In a fourth aspect, in addition to one or more of the preceding or following aspects, or in the alternative to some aspects, the control system can include a light output configured to be operatively connected to a hazard light circuit of the vehicle, the light output configured to control one or more lights of the vehicle, wherein the light output can be operatively connected to the hazard light circuit with an insulation displacement connector.

In a fifth aspect, in addition to one or more of the preceding or following aspects, or in the alternative to some aspects, the wireless relay system further includes a relay adaptor connector configured to connect the wireless relay system to the vehicle relay location in the under-hood relay box in the engine compartment of the vehicle, wherein the relay adaptor can be plugged into and removed from the vehicle relay location without damaging or modifying the vehicle relay location.

In a sixth aspect, in addition to one or more of the preceding or following aspects, or in the alternative to some aspects, the relay adaptor connector can include a plurality of electrical connectors, wherein each of the plurality of electrical connectors can be configured to be electrically connected to one of a plurality of sockets of an original equipment manufacturer vehicle relay location in the under-hood relay box in the engine compartment of the vehicle.

In a seventh aspect, in addition to one or more of the preceding or following aspects, or in the alternative to some aspects, the wireless relay housing encloses the circuit control relay and the interlock control relay, wherein the wireless relay housing can be configured to be disposed outside of the engine compartment relay box and can be configured to be operatively connected to the engine compartment relay box with the relay adaptor connector.

In an eighth aspect, in addition to one or more of the preceding or following aspects, or in the alternative to some aspects, the wireless relay system further can include a horn control assembly that can include: horn control relay disposed in the wireless relay housing and configured to activate a horn of the vehicle based on the signals received by wireless receiver, and a horn output, wherein the horn output can be operatively connected to a horn circuit of the vehicle, wherein the horn output can be connected to the horn circuit of the vehicle at a fuse of the horn circuit, wherein the horn control assembly can be configured to retain the function of the horn fuse.

In a ninth aspect, in addition to one or more of the preceding or following aspects, or in the alternative to some aspects, the wireless transmitter and the wireless receiver can be configured to operate in a frequency range of at least 260 MHz and not more than 929 MHz.

In a tenth aspect, in addition to one or more of the preceding or following aspects, or in the alternative to some aspects, the wireless transmitter can be disposed outside of the control system housing.

In an eleventh aspect, in addition to one or more of the preceding or following aspects, or in the alternative to some aspects, the circuit control relay can be configured to provide power to the interlock control relay when a circuit control relay switch can be in a closed position.

In a twelfth aspect, in addition to one or more of the preceding or following aspects, or in the alternative to some aspects, the wireless relay system includes at least four electrical connectors configured to connect the wireless relay system to the vehicle relay location in the under-hood relay box in the engine compartment of the vehicle, wherein the circuit control relay can be electrically connected to three of the at least four electrical connectors, and wherein the interlock control relay can be electrically connected to two of the at least four electrical connectors.

In a thirteenth aspect, in addition to one or more of the preceding or following aspects, or in the alternative to some aspects, the circuit control relay can include a circuit control relay coil and a circuit control relay switch, and the interlock control relay can include an interlock control relay coil and an interlock control relay switch.

In a fourteenth aspect, in addition to one or more of the preceding or following aspects, or in the alternative to some aspects, wherein wireless relay system can be configured so that current flows to a starter motor of the vehicle through the vehicle relay location only when the circuit control relay switch and the interlock control relay switch can be closed, and wherein the interlock control relay coil selectively opens and closes the interlock control relay switch based on the signals received by the wireless receiver.

In a fifteenth aspect, in addition to one or more of the preceding or following aspects, or in the alternative to some aspects, the vehicle relay location can be one of a vehicle starter relay location, a vehicle fuel pump relay location, a vehicle validation circuit relay location, a vehicle electric motor engagement relay, or a brake pedal engagement circuit relay location.

In a sixteenth aspect, a wireless relay system includes a wireless relay housing configured to be disposed in an engine compartment of a vehicle and configured to be electrically connected to a vehicle relay location in an under-hood relay box in the engine compartment of the vehicle, the wireless relay housing enclosing: a wireless receiver configured to receive signals from a wireless transmitter in a passenger compartment of the vehicle, a circuit control relay can include a circuit control relay actuation coil and a circuit control relay switch, and an interlock control relay configured to be electrically connected to the circuit control relay, the interlock control relay configured to selectively allow operation of the vehicle based on the signals received by the wireless receiver from the wireless transmitter.

In a seventeenth aspect, in addition to one or more of the preceding or following aspects, or in the alternative to some aspects, a wireless relay system can include a relay adaptor connector configured to electrically connect the wireless relay housing to the vehicle relay location in the under-hood relay box in the engine compartment of the vehicle, wherein the relay adaptor can be plugged into and removed from the vehicle relay location without damaging or modifying the vehicle relay location, the relay adaptor connector can include a plurality of electrical connectors, wherein each of the plurality of electrical connectors can be configured to be electrically connected to one of a plurality of sockets of an original equipment manufacturer vehicle relay location in the under-hood relay box in the engine compartment of the vehicle.

In an eighteenth aspect, in addition to one or more of the preceding or following aspects, or in the alternative to some aspects, a wireless relay system further can include a horn control assembly can include: horn control relay disposed in the wireless relay housing and configured to activate a horn of the vehicle based on the signals received by wireless receiver, and a horn output, wherein the horn output can be operatively connected to a horn circuit of the vehicle, wherein the horn output can be connected to the horn circuit of the vehicle at a fuse of the horn circuit, wherein the horn control assembly can be configured to retain function of the horn fuse.

In a nineteenth aspect, in addition to one or more of the preceding or following aspects, or in the alternative to some aspects, the circuit control relay can be configured to provide power to the interlock control relay when a circuit control relay switch can be in a closed position.

In a twentieth aspect, a method of installing a vehicle immobilization system in a vehicle includes placing a control system in a passenger compartment of the vehicle, where the control system can include a wireless transmitter configured to transmit signals, connecting the control system to a detection element such that the control system can be configured to receive an input signal from the detection element indicating a level of intoxicant in a user, removing an original equipment manufacturer vehicle relay from an original equipment manufacturer vehicle relay location in an under-hood relay box in an engine compartment of the vehicle, providing a wireless relay system can include a wireless relay housing, a circuit control relay within the wireless relay housing, an interlock control relay connected to the circuit control relay and within the wireless relay housing, and a wireless receiver connected to the interlock control relay and configured to receive the signals from the wireless transmitter, electrically connecting the circuit control relay of the wireless relay system to portions of the original equipment manufacturer vehicle relay location in the under-hood relay box in the engine compartment of the vehicle, and electrically connecting the interlock control relay to portions of the original equipment manufacturer vehicle relay location in the under-hood relay box in the engine compartment of the vehicle.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
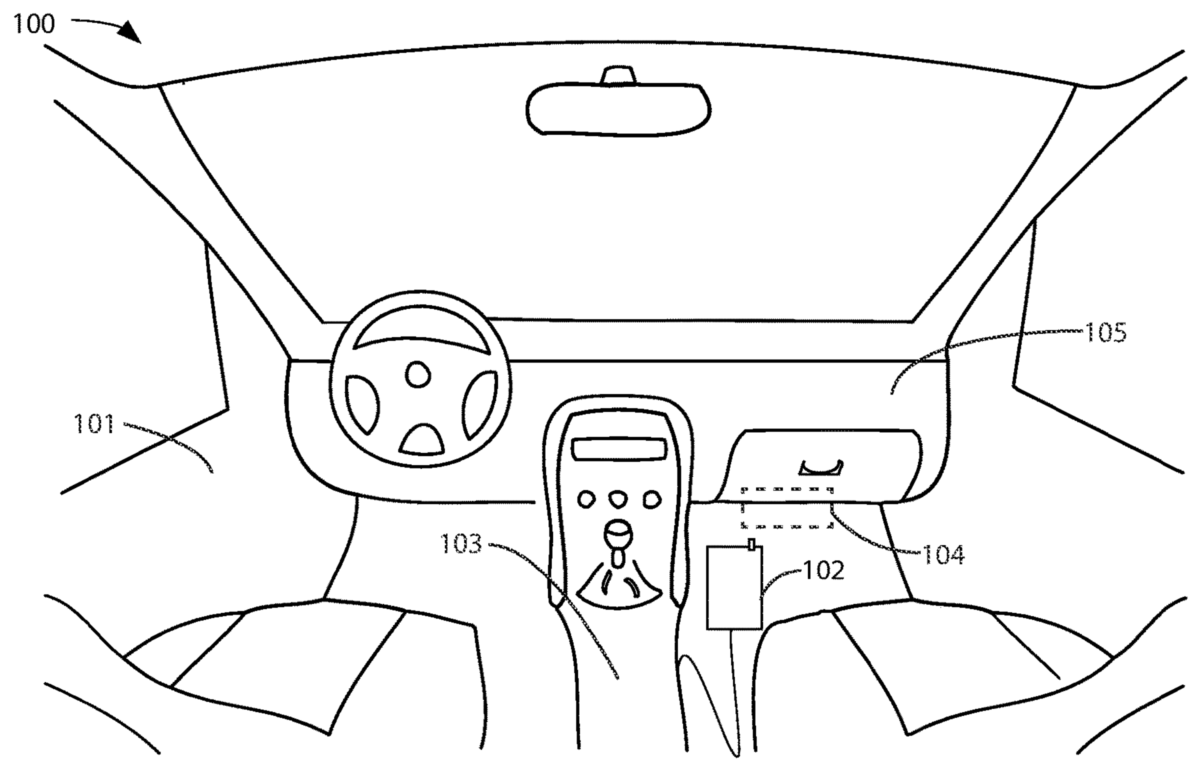
FIG. 1 is a part of a vehicle interior including components of a vehicle immobilization system in accordance with various embodiments herein.

While embodiments are susceptible to various modifications and alternative forms, specifics thereof have been shown by way of example and drawings and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Breath alcohol ignition interlock devices, also known as BAIIDs, are commonly installed in vehicles to prevent a driver with a history of driving while intoxicated from starting a motor vehicle when the driver's breath alcohol concentration (BAC) is at or above a set alcohol concentration. Concentration of alcohol in a driver's breath is closely proportional to the concentration of alcohol in the driver's blood, which is typically the basis upon which intoxication is legally determined. Because a driver must blow into an alcohol-sensing element of a BAIID that measures the amount of alcohol in the driver's breath before the BAIID enables normal car operation, the BAIID can effectively prevent intoxicated drivers from driving a vehicle while intoxicated by selectively disabling the vehicle based on successful completion of the required BAIID test.

Installation of a BAIID system typically involves hard-wiring the BAIID system into the car's electrical system at several locations, including connections to disable the vehicle's starter, fuel pump, ignition, or other elements critical to the vehicle's operation, and including connecting the BAIID to vehicle instrumentation such that it can monitor the car's operation to ensure that unauthorized operation is not taking place.

Connecting the BAIID device to several different systems associated with the engine and dash instrumentation of the vehicle typically involves routing wires from the BAIID device in the passenger compartment of a car to one or more systems within the engine compartment such as a starter or fuel pump, and to one or more instrumentation systems such as the speedometer, odometer, or other such dashboard instrumentation. Although installation can vary significantly from vehicle to vehicle, a typical process therefore involves determining a preferred installation plan for the particular vehicle, removing part of or all of the dash, drilling a hole through the firewall to access the engine compartment, and routing and securing wiring harnesses to each system to be controlled or monitored by the BAIID. The time and cost to install the BAIID device often runs into hundreds or thousands of dollars, and many hours of work. Further, the installation typically results in permanent changes to the vehicle, as it involves cutting holes in the vehicle to run wires, cutting, and splicing wires, and attaching components of the BAIID system, such as various wiring harnesses, to the vehicle.

For example, to interrupt the starter circuit, a wire of the starter circuit is cut, and the two sides of that cut are electrically connected to a starter circuit harness of the BAIID device. The starter circuit and therefore starter circuit cut is located in the engine compartment of the vehicle, and the starter circuit harness needs to pass through the firewall of the vehicle. An opening may therefore need to be drilled in the firewall to allow the starter circuit harness to pass through. It may or not be possible to use an existing opening in the firewall, as existing openings already accommodate vehicle wiring and may not have room for more wiring.

Some examples described herein provide for BAIID systems or devices having improved functionality and reduced cost, installation time, installation cost, and installation changes to the vehicle, as described herein. Instead of cutting a starter circuit and hard-wiring a BAIID system to the starter circuit of a vehicle, the system described herein uses wireless communication to control a relay component that is electrically connected to an under-hood relay location in a relay box.

The present vehicle immobilization system improves installation and integration with future technologies over conventional hard-wired BAIID systems. The vehicle immobilization system can include an intoxicant detection unit and a control system located in the passenger compartment, where the control system has a wireless transmitter. The system can further include a wireless relay system positioned under the hood of the vehicle, including a wireless receiver, that is configured to connect to an original equipment manufacturer (OEM) relay location, such as a starter relay location. The vehicle immobilization system provides a large benefit for systems where physically interrupting the starter circuit is challenging because wiring is difficult to access. The system also allows a less experienced technician to complete an installation process and potentially can expand the qualified service centers that can execute an installation. The vehicle immobilization system eliminates the need to cut any wires in the starter circuit. In some embodiments of the installation system and method, no wires are cut during the installation process. Instead, the OEM vehicle relay is removed and replaced with an electrical connection to a wireless relay system, which includes a wirelessly-activated relay module. The aforementioned features of the vehicle immobilization system result in a decrease in installation time and a decrease in the changes made to the vehicle during installation.

Examples of the system will now be described with reference to the FIGS. Some components are designed to be positioned inside the passenger compartment and to be in wireless communication with other components positioned under the hood of the vehicle.

Figure 2:
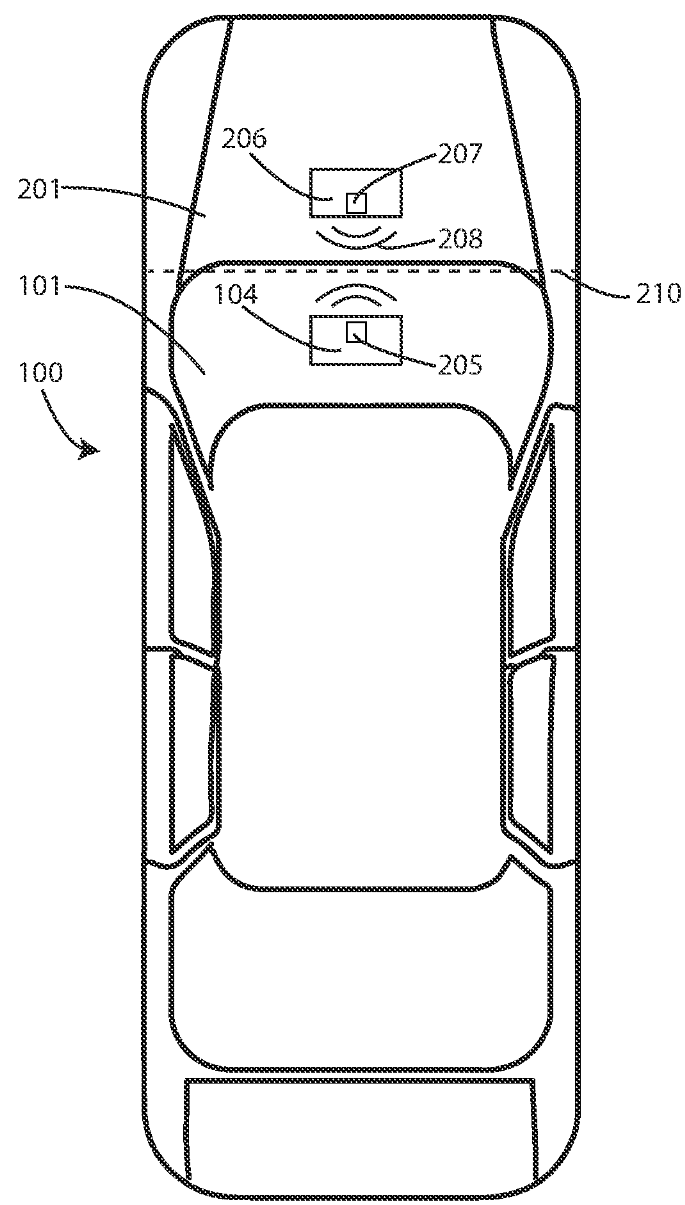
FIG. 2 is a top view of a vehicle including components of a vehicle immobilization system in accordance with various embodiments herein.

Locations of Control System, Detection Unit, and Wireless Relay System (FIGS. 1-2)

Referring now to FIG. 1 a portion of an interior of a vehicle is shown in accordance with various embodiments herein. Here, the interior of vehicle 100 includes a driver's seat on the left, a front passenger seat on the right, a steering wheel, and other common elements of a typical car interior. The vehicle further includes a Breath Alcohol Ignition Interlock Device (BAIID) detection unit 102, configured to selectively enable vehicle operation based on a driver's intoxication state. In some examples, the detection unit 102 is coupled to a control system 104 which is part of vehicle immobilization system.

In various embodiments, the control system is configured to fit within a passenger compartment 101 of a vehicle 100, such as under or behind the dashboard 105 of the vehicle, within the center console 103 of the vehicle, or both. In some examples, installation of the BAIID system involves mounting the control system 104 under the dashboard 105 of the vehicle 100 and coupling the detection unit 102 to the control system 104. While the dashboard is not removed during daily use of a vehicle, automotive technicians are typically capable of easily removing and reattaching the dashboard of a vehicle. As used herein, a dashboard is one or more panels present in the passenger compartment of the vehicle that cover functional components of the vehicle. A large portion of dashboard is typically located between the passenger seats and a firewall, covering components from exposure to the passengers. As used herein, the firewall is a part of the automobile body that separates the engine compartment from the passenger compartment and is designed to prevent the spread of fire.

The detection unit 102 can be coupled to the control system 104 via a wired connection. In an alternate example, the connection between the control system and the detection unit is wireless, such as using radio-frequency communications. In various embodiments, the installation has only the detection unit exposed in the vehicle for passenger interaction, which reduces the chance of tampering with the system. The control system 104 may also be connected to other vehicle systems, such as to a power source, and to the ignition or other systems to monitor the operating state of the vehicle.

Referring now to FIG. 2, a top view of a vehicle including components of a vehicle immobilization system is shown in accordance with various embodiments herein. In various embodiments, the vehicle 100 can include a control system 104 disposed within a passenger compartment 101 of the vehicle 100 and a wireless relay system 206 disposed in the engine compartment 201 of the vehicle 100. In some embodiments, the wireless relay system 206 may be located in other locations within the car, including wherever relays or critical system components may be located as manufactured by the original equipment manufacturer. For example, a fuel pump and fuel pump relay may be located in or near a fuel tank. In various embodiments, a wireless relay system 206 can interface with a fuel pump or fuel pump relay and be placed in or near the fuel tank. In some embodiments, critical systems are located in the passenger compartment, under the passenger compartment, or in a rear compartment, and the wireless relay system 206 can be located in the passenger compartment, under the passenger compartment, or in a rear compartment to interface with those critical systems.

In various embodiments the control system 104 and the wireless relay system 206 are configured for wireless communication. The control system 104 can include a wireless transmitter 205 configured to transmit signals 208. The wireless relay system 206 can include a wireless receiver 207 configured to receive the signals 208 from the wireless transmitter. In various embodiments, the wireless transmitter is configured to send signals to the wireless receiver 207 through the firewall 210 of vehicle 100.

In operation, a user is unable to start the vehicle using the ignition without first blowing a breath sample into the detection unit 102 that indicates the user is not intoxicated. The detection unit 102 determines the amount of alcohol in the user's breath using a fuel cell or other device operable to quantify the amount of ethanol in a breath sample and sends a signal indicating a level of intoxicant in the user's breath to the control system 104. The signal can take different forms. In various embodiments, the control system sends a pass signal or go signal to the wireless relay system 206 to enable normal operation of the vehicle if the user's breath has an ethanol concentration below a specified threshold. In some embodiments, the control system does not send a signal to the wireless relay system if the user's breath has an ethanol concentration at or above the threshold. In these embodiments, the vehicle remains immobilized because it has not received a go signal. In other embodiments, the control system sends a fail signal to the wireless relay system.

In some embodiments, the detection unit 102 sends a signal providing a numeric indication of the level of intoxicant in the user's breath to the control system 104 and the control system 104 compares it to the specified threshold. If the threshold is not exceeded, the wireless relay system 206 responds to the signal by bringing one or more vehicle systems to a normal operational state, such as by enabling a starter motor or fuel pump relay to receive a control signal to start or run the vehicle.

Figure 3:
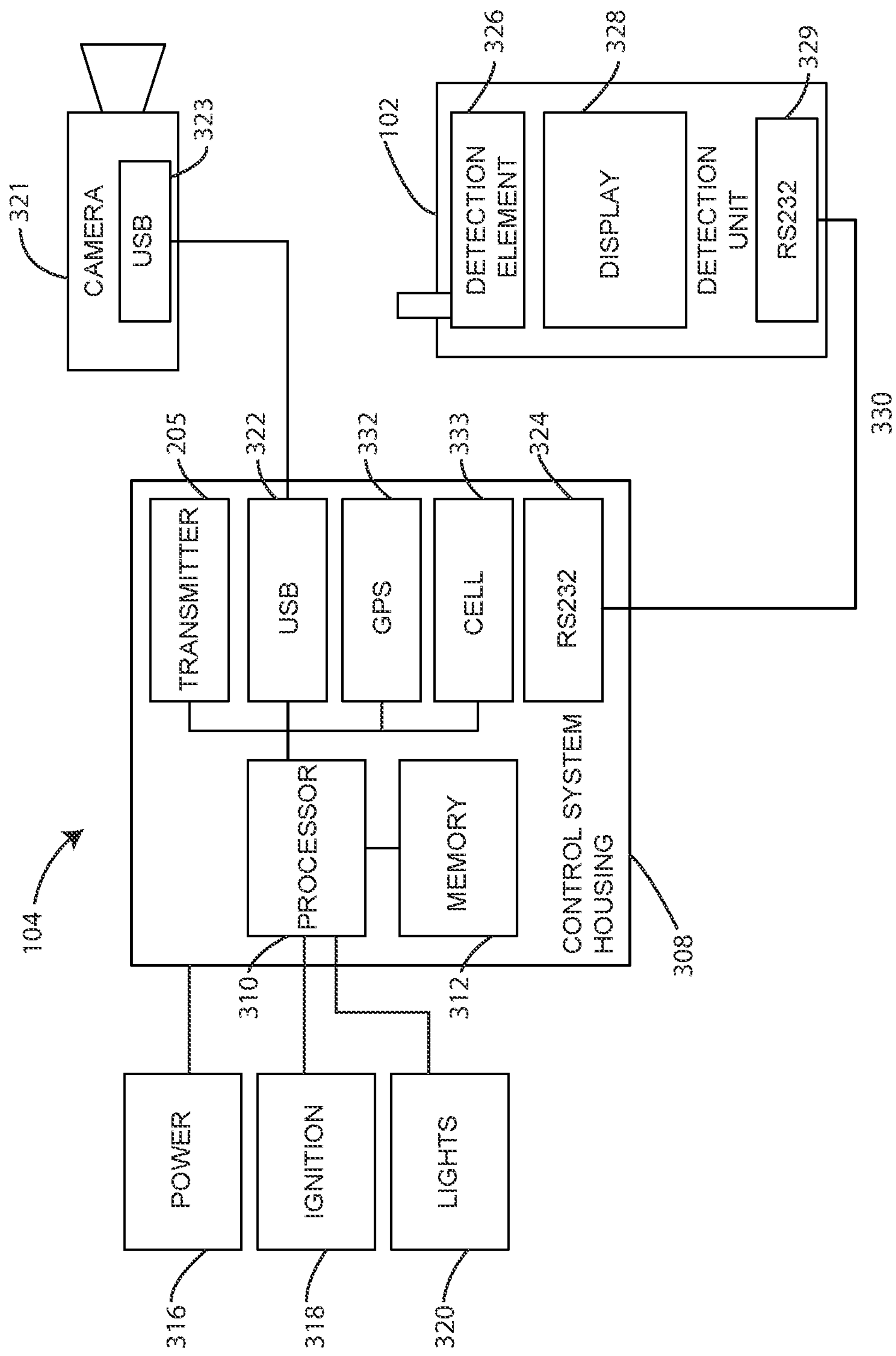
FIG. 3 is an exemplary schematic of a control system in accordance with various embodiments herein.

Control System of FIG. 3

Referring now to FIG. 3, an exemplary schematic of a control system is shown in accordance with various embodiments herein. The control system 104 can have a control system housing 308 configured to fit within a passenger compartment 101 of a vehicle 100. The control system housing 308 can be sized to fit under the dash or within the center console. Alternatively, the control system housing 308 can be in a different location, such as secured to a structure within the passenger compartment 101. In various embodiments, the control system housing 308 can be installed in the vehicle such that it is hidden from view during day-to-day use of the car by the driver and passengers. In various embodiments, the control system housing 308 is configured to be tamperproof. For example, the control system housing 308 can be constructed to prevent unauthorized users from opening the control system housing and accessing components within the control system housing. The control system housing 308 can alternatively or in addition be constructed to detect unauthorized users opening the control system housing. This can be accomplished by incorporating a lock, a tamper-proof seal, or the like.

The control system 104 can include a wireless transmitter 205 configured to transmit signals. In various embodiments, the wireless transmitter 205 transmits signals in the radio frequency range. Many options are possible for the wireless transmitter 205, as discussed further herein.

The control system 104 can have a processor 310 disposed within the control system housing 308. In various embodiments, the processor is operable to perform various functions and be configured to connect with the vehicle, with a cellular monitoring system, with a camera, and the like. The control system 104 can have a memory 312. The memory 312 can be operably connected to the processor 310 and configured to store instructions for or output from the processor 310 of the control system 104.

In various embodiments, the control system can be operatively connected to a detection unit 102 such that the control system is configured to receive a signal from the detection unit indicating a level of intoxicant. In various embodiments, the detection unit is a breath alcohol detector for detecting alcohol in the user's breath.

The detection unit 102 can include a display 328 operable to display text or graphics to a user. The detection unit 102 can further include a detection element 326 or other sensing element operable to detect the presence of an intoxicant, the level of an intoxicant, or both the presence and level of an intoxicant. In a more detailed example, a detection element 326 is included in the detection unit 102 and is operable to detect the level of ethanol in a user's breath. In some embodiments, the detection unit 102 is coupled to the control system through connection 330 between an RS232 interface 324 on the control system 104 and an RS232 interface 329 on the detection unit 102. Alternatively, the detection unit 102 is coupled to the control system by a wireless connection such as a radio frequency connection, Bluetooth connection, USB connection, or other suitable connection. The detection unit in this example is a handheld device, such that a user may pick the unit up to facilitate conducting a breath test using the detection element 326. The detection unit and control system are shown as separate elements in the example of FIG. 3, but in other examples can be integrated into the same physical unit, can be implemented in whole or in part using other devices such as a user's smartphone, and may include fewer or additional features from the example shown here.

In various embodiments, the control system 104 can be connected to a camera 321. The camera 321 can be coupled to the control system 104 through USB interface 322 on the control system 104 and USB interface 323 on the camera 321. Alternatively, the camera 321 is coupled to the control system 104 through a radio frequency connection, Bluetooth connection, a serial connection, or other suitable connection.

In various embodiments, USB interface 322 and camera 321 enable the vehicle immobilization system to record pictures or video of the person using the detection unit 102, such as breathing into the detection unit 102 to complete a breath test, or to document if a person other than the driver is using the detection unit. This significantly reduces the ability of a user who is required to use the vehicle immobilization system to falsely appear to pass the test by having someone else complete the breath test, adding to the safety and security of the vehicle immobilization system.

The control system can include a GPS receiver 332. In various embodiments, GPS receiver 332 is operable to track the location of the control system 104, and therefore of the vehicle, enabling the control system 104 to record the location of various tests, and to perform other functions such as to detect if the vehicle is moving when a valid intoxication breath test has not been completed.

The control system can include a cellular modem 333. In various embodiments, the cellular modem 333 can communicate with remote systems, such as to report movement of the vehicle, to report violations or attempts to defeat the vehicle immobilization system, or to send test information such as photos accompanying each intoxication test to a monitoring agency to ensure that only the intended user is completing the breath intoxication tests.

In operation, the control system 104 derives power through the vehicle, through batteries, or through both to power the processor 310 and other circuitry to perform basic vehicle immobilization system functions. In some embodiments, the control system has a power input 316, configured to be electrically connected to a constant power source in the vehicle 100 and to deliver power to the control system 104 from the constant power source. As used herein, a constant power source is a source that supplies power regardless of the key or starter component position, so that power is supplied even when the key is in the off position, or a start button has not been pushed by the driver. In some embodiments, the power input 316 is configured to connect to the fuse box in the passenger compartment 101 of the vehicle 100. In some embodiments, the power input 316 is electrically connected to a fuse of a vehicle, such as a 12 V constant power fuse in the fuse box in the passenger compartment 101 of the vehicle 100, using a fuse tap, or the like. Examples of fuse locations with a constant power source include fuse locations for a clock, alarm system, or remote starter.

The control system 104 can include a light output 320. A light output 320 can be provided in some embodiments in order to give the control system the ability to activate hazard lights or other lights of the vehicle. In some states, it is a requirement to activate hazard lights of a vehicle if a test by the detection unit exceeds a threshold in certain scenarios, such as if the car has already been started. In various embodiments, the light output 320 is electrically connected to a hazard light switch of the vehicle 100 and is configured to control one or more lights of the vehicle. The control system 104 can therefore send a signal to the body control module of the vehicle that emulates the user pressing the hazard button to activate the hazard lights. As used herein, the hazard light switch is the button or other input device in the passenger compartment that is activated by the user to turn on the hazard lights of the vehicle. In some embodiments, the light output 320 is operatively connected to the hazard light switch output with an insulation displacement connector, a tap connector, or the like. By tapping into the output of the hazard light control switch, the light output 320 controls an input of the body control module of the vehicle and can trigger the hazard lights of the vehicle upon receiving a command from the control system 104. In various embodiments, the control system 104 is configured to output a signal using the light output 320 to activate the hazard lights. Situations for activating the hazard lights can include the driver failing to provide a breath sample when requested or providing a breath sample that exceeds the intoxication threshold. By connecting the light output of the control system 104 to the output of the hazard light switch of the vehicle, the control system can control all the hazard lights using just one electrical connection. Another benefit of this configuration is that the hazard light switch in a vehicle is labeled in a universal way with a red triangle and therefore relatively easy to find.

Instead of or in addition connecting the light output 320 to a vehicle light system, the light output 320 can be a separate lighting device which is not part of the original vehicle system but is provided as a part of the vehicle immobilization system. In various embodiments, the light output 320 is a lighting device configured to attach to a component within the passenger compartment, such as the front windshield, a window, a pillar column, or a dashboard. In various embodiments, the light output 320 is configured to point outward from the passenger compartment so that it would be visible to law enforcement or other people outside of the vehicle. The light output 320 can be configured to operate, such as flash, in the same ways described herein with respect to the light output 320 operating the vehicle lights, such as when a driver fails to provide a breath sample or provides a breath sample that exceeds the intoxication threshold. In some examples, when a light output 320 is provided as a separate lighting device included with the vehicle immobilization system that attaches to the vehicle, then the light output 320 will not need to be electrically connected to a vehicle lighting system, as the same function can be provided by the separate lighting device. In this scenario, installation of the system is further simplified.

The light output 320 can be connected to the control system housing 308 by a wired connection. Alternatively, the light output can be in wireless communication with the transmitter 205 to receive a command to turn on.

In operation a user typically starts a vehicle by turning a key, pushing a button, or providing another input to power the vehicle systems and to power the control system through the vehicle's relay box. When the control system receives the power signal from the vehicle via the ignition input 318, it initiates communication with the vehicle and starts a vehicle immobilization system procedure. The procedure in one example includes prompting a user via the display 328 of detection unit 102 to blow a breath into detection element 326 that is sufficiently long and has a sufficient volume of air to verify that the user is not intoxicated, such as having an ethanol level in breath that is lower than a preset threshold. If the user's breath passes the intoxication test, the control system 104 signals the vehicle to enable the vehicle to start. For instance, the control system can enable one or more vehicle systems that are disabled by signaling wireless relay system 206 to enable an operative state of the vehicle system. The vehicle system or systems are disabled by virtue of the installation of an interlock system to have a normally open circuit that is not closed until receiving a signal that the user has passed the intoxication test. In a further example, the control system is operable to detect and record abnormal operation of the vehicle or wireless relay system 206, which may suggest that an unauthorized person has removed, replaced, or tampered with the wireless relay system 206.

After the driver passes an initial intoxication test, the vehicle is put into an operative state and the driver is able to start the vehicle. The vehicle start after an intoxication test is passed can be referred to as the start of a trip. In various embodiments, the control system 104 is configured to prompt randomly-timed, rolling sample requirements, or retests, throughout the duration of a trip. At any time during a trip, the control system may initiate a retest by prompting the driver to provide another breath sample or otherwise use the detection unit 102. In various embodiments, if a retest is missed or failed, the vehicle immobilization system will execute one or more of providing an audible notification, providing a visible notification, providing an audible notification and a visible notification, honking a horn, and flashing hazard lights. Such retests dissuade attempts at circumventing the vehicle immobilization system by drinking after starting the vehicle or having someone other than the driver provide the sample to start the vehicle.

The vehicle immobilization system may continue to periodically prompt retests for the duration of the trip. In various embodiments, vehicle immobilization system can determine the start and end of a trip from an ignition status of the vehicle. The control system can include an ignition input 318 configured to be electrically connected to a part or system of the vehicle that has a voltage, sequence of voltage changes, signal message, or signal level indicating whether or not the car is in a state where the operator can drive the car. The ignition input can provide an ignition status of the vehicle 100 to the control system 104. In some embodiments, the ignition input 318 is configured to be electrically connected to the ignition harness of the vehicle with an insulation displacement connector, a tap connector, or the like.

In various embodiments, the ignition input is configured to determine a start of a trip when the ignition voltage rises above zero volts and an end of a trip when the ignition voltage falls to zero volts. In various embodiments, the control system is configured to initiate a retest only when the ignition input, ignition input history, or both indicates that a trip is in progress.

Vehicles having an automatic start/stop feature can present a challenge to the timing of retests. An automatic start/stop event, as defined herein, is when the vehicle automatically shuts off the engine when a trip is in progress and the engine has been idling for a threshold period. This threshold could be met while the user is at a red light or coasting, for example. Typically, the ignition voltage drops, but doesn't go to zero volts during an automatic start/stop event. Likewise, some other system or part in the vehicle may contain wiring whose voltage or signal changes when the car state changes from "engine running" to "engine not running." Conversely, the ignition voltage will drop to zero when a user shuts off the vehicle at the end of a trip. Additionally, other wiring in the vehicle may indicate the car has entered a state where it is no longer operable without re-electrifying certain circuits. Consequentially, through the ignition input, the control system can determine whether the drop in voltage is the result of an automatic start/stop event or the driver ending the trip. Upon detecting a subsequent rise in ignition voltage with the ignition input, the control system can initiate a new test if the ignition input indicates that the trip ended but will not initiate a new test if the ignition input indicates that an automatic start/stop event occurred. Alternatively or in addition, after an engine or trip stop, the system does not initiate a retest unless the car is in "off" mode for more than a threshold "free restart" time period. These features can mitigate the inconvenience of the control system initiating a new test after each automatic start or stop of the engine during a single trip.

Figure 4:
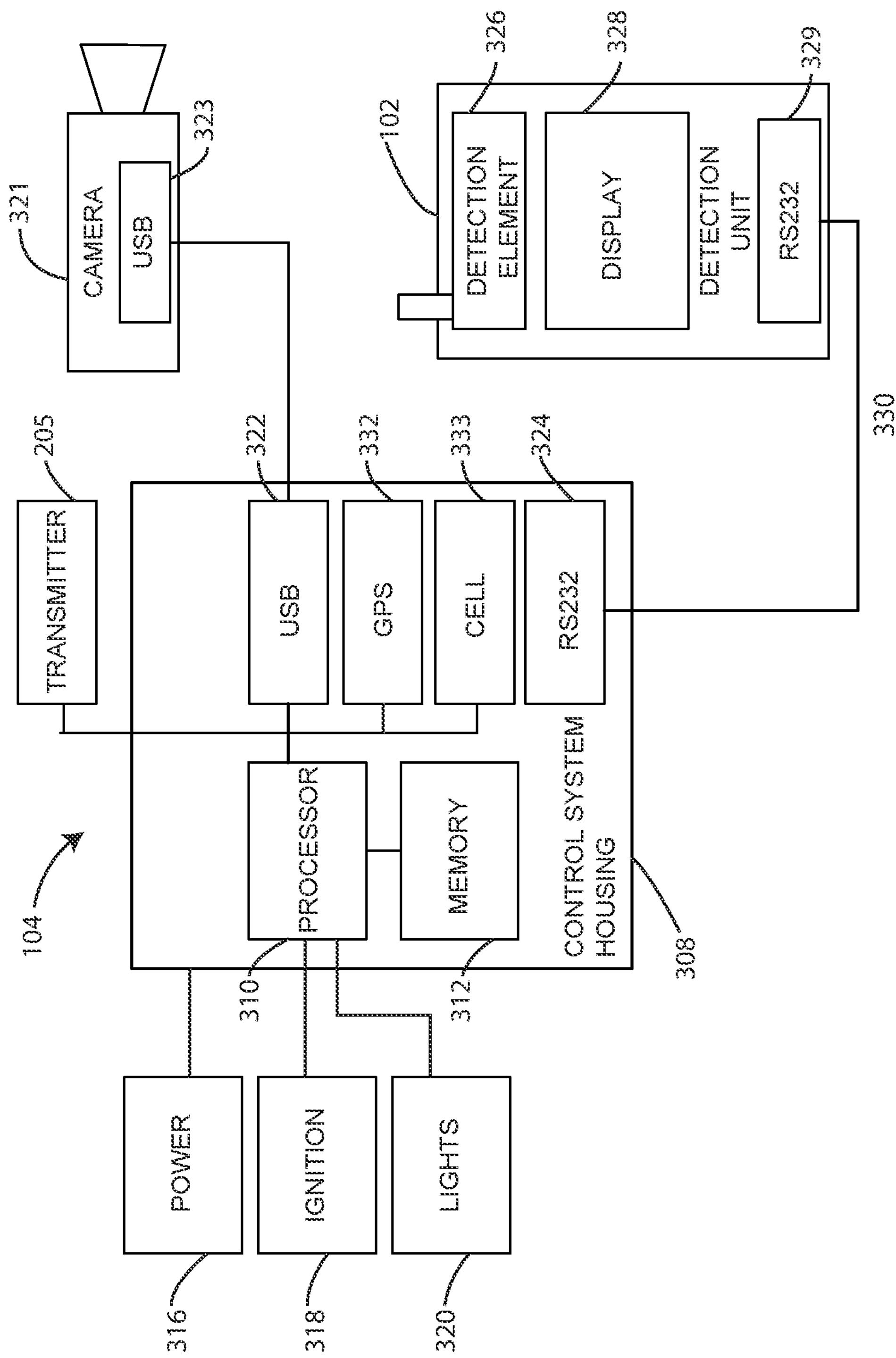
FIG. 4 is an exemplary schematic of a control system in accordance with various embodiments herein.

Control System with Transmitter Outside of the Control System Housing (FIG. 4)

Referring now to FIG. 4, an exemplary schematic of a control system is shown in accordance with various embodiments herein. The example of FIG. 4 depicts a control system 104 having the same components as in FIG. 3. However, FIG. 4 depicts a control system 104 having wireless transmitter 205 disposed outside of the control system housing 308. Such an embodiment can be particularly advantageous when re-purposing a legacy control system. A legacy control system is a control system configured to control the vehicle via one or more wired connections. As used herein, a legacy control system does not include a transmitter for communicating with a receiver connected to the vehicle's starter system, fuel system or other system critical to the operation of the vehicle. A legacy control system may include many of the components of the control system 104 described herein, such as a housing, a processor, a memory, USB and RS232 connectors, a GPS receiver, and a cell module. A legacy control system will also typically include a high-current relay that is wired to control the starter circuit of the vehicle via a starter circuit wiring harness. If a legacy control system is used as a part of the control system 104, the high-current relay can be disconnected from the other components or removed entirely if it will not be used to control the starter circuit of the vehicle. Alternatively, the high-current relay can be wired to the transmitter and is configured to trigger the signal sent by the transmitter. By accommodating reuse of many of the components of a legacy control system, the system described herein can decrease waste, reduce cost and extend the useful life of an existing fleet of components.

Figure 5:
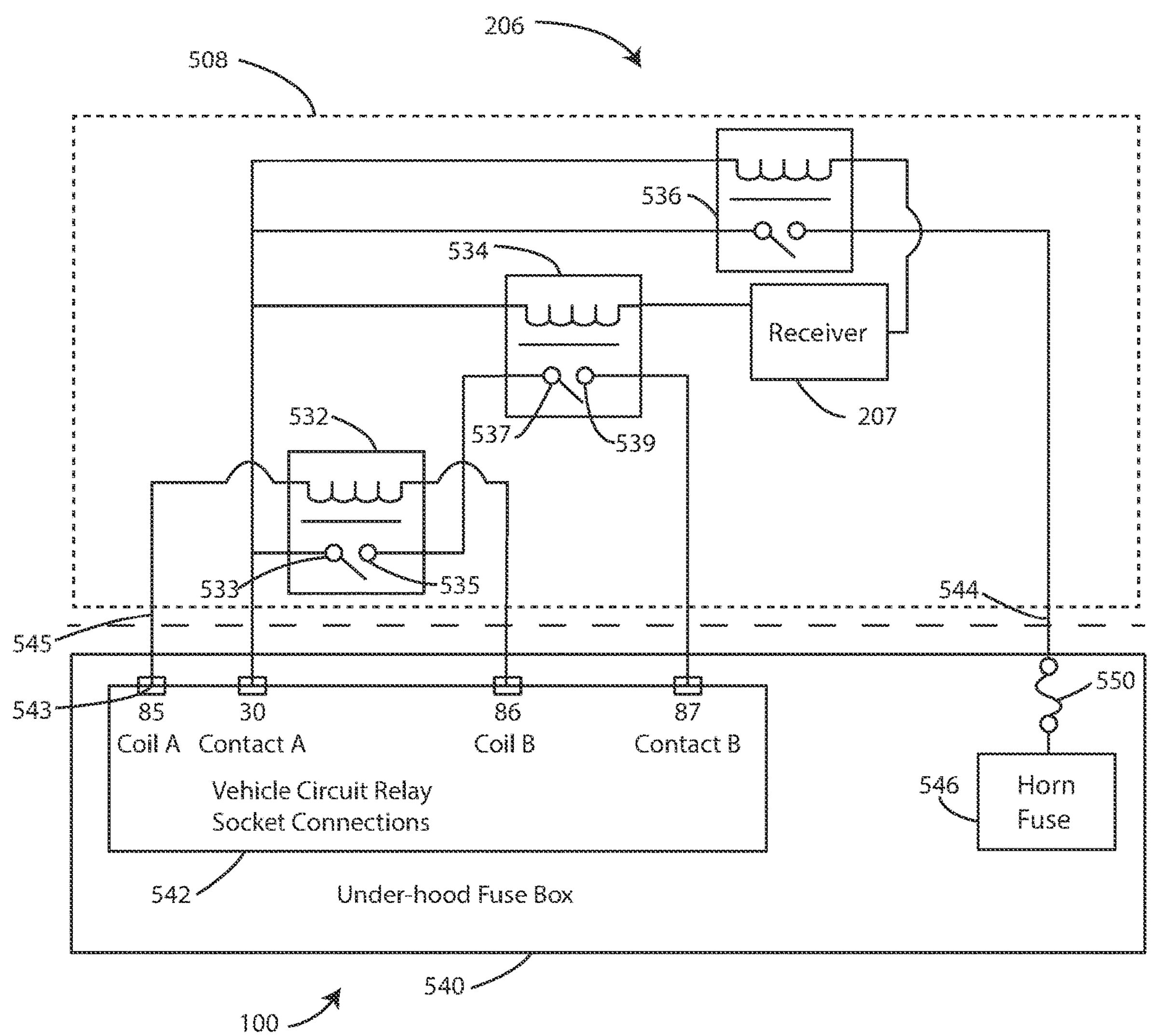
FIG. 5 is an exemplary schematic of a relay system in accordance with various embodiments herein.

Wireless Relay System Under Vehicle Hood (FIG. 5)

Referring now to FIG. 5, an exemplary schematic of a wireless relay system is shown in accordance with various embodiments herein. The wireless relay system 206 can include a wireless relay housing 508. The wireless relay housing 508 can be sized to fit within an engine compartment of the vehicle, under the vehicle's hood. The wireless relay system can include plurality of electrical connectors 545 configured to be plugged into a plurality of sockets 543 of a relay location 542, such as the starter relay location, in the engine compartment relay box 540 of vehicle 100. The sockets 543 of the relay location 542 are configured to accept prongs of a conventional automotive relay. Examples of electrical connectors 545 include pins or terminals.

Before the electrical connectors 545 are connected to the relay location, the OEM or other previously-installed vehicle relay is removed from the vehicle's relay location. The vehicle's relay location may be within an under-hood fuse box or another location in the vehicle's engine compartment. The under-hood fuse box can also be referred to as a relay box, under-hood relay box, under-hood relay or simply fuse box.

In various embodiments, the plurality of electrical connectors 545 protrude from wireless relay housing 508. In various embodiments, the plurality of electrical connectors 545 are long enough to allow the wireless relay housing 508 to be positioned outside of the relay box containing the relay location 542. In the alternative, the wireless relay system 206 may be sized to fit within the vehicle's relay box. In some embodiments, the plurality of electrical connectors 545 are provided within a housing configured to mate directly with a socket connection of a particular OEM relay location. The electrical connectors 545 could also be provided within a cable and housing configuration.

In some examples, the electrical connectors 545, a housing configuration for the electrical connectors 545, or a cable and housing configuration for the electrical connectors 545 can be plugged into and removed from the relay location without damaging or modifying the relay location. In various examples, these connections to the relay location can be made easily, using hands of the installer, and without tools.

The wireless relay system 206 can include a wireless receiver 207 configured to receive signals from the wireless transmitter 205 of control system 104. The wireless relay system 206 can include one or more relays. In the context of this application, a relay is defined as an electrically-operated switch. A relay can be an electromechanical relay having an electromagnetic coil and switch. A relay can be a solid state relays including semiconductors and using an LED as a control input. A relay can be a hybrid relay including both an electromagnetic relay controlling the load circuit and a solid state relay providing the control input. A relay can also be a reed relay, an electrothermal relay, a polarized relay having a permanent magnet and an electromagnet, or a nonpolarized relay, or another type of electrically-operated switch.

The wireless relay system can include a circuit control relay 532. The circuit control relay 532 is an electronically-operated switch component within the wireless relay system. In various embodiments, the circuit control relay 532 is configured to be electrically-connected to a relay location in an under-hood relay box in the engine compartment of the vehicle. In some embodiments, the circuit control relay 532 can have a circuit control relay actuation coil and a circuit control relay switch having a first switch contact 533 and a second switch contact 535. In various embodiments, activating the ignition switch of the vehicle 100 allows current to flow through the circuit control relay 532. In one example, activating the ignition switch of vehicle 100 sends an electrical current to the circuit control relay 532, powering the circuit control relay coil and causing the circuit control relay switch to close.

The wireless relay system 206 can include an interlock control relay 534. In some embodiments, the interlock control relay 534 can include an interlock control relay actuation coil and an interlock control relay switch, having a first switch contact 537 and a second switch contact 539. In various embodiments, the interlock control relay 534 receives current at a first switch contact 537 from circuit control relay 532 when the circuit control relay 532 is in a closed position. The first switch contact 537 of the interlock control relay switch can be electrically connected to circuit control relay second switch contact 535 such that the interlock control relay 534 receives current from circuit control relay 532 when the circuit control relay 532 switch is in a closed position, as illustrated in FIG. 5.

In various embodiments, the interlock control relay 534 is configured to selectively allow operation of the vehicle based on the signals sent by the wireless transmitter 205 and received by the wireless receiver 207. For instance, the interlock control relay 534 can be disposed between the circuit control relay 532 and the relay location 542 and is configured to selectively prevent current from flowing to the starter motor of a vehicle based on the signals sent by the wireless transmitter 205 and received by the wireless receiver 207. In various embodiments, the interlock control relay coil is electrically connected to the wireless receiver 207 such that wireless receiver can activate the interlock control relay and allow current to flow to the starter motor of vehicle 100 when a start event is requested by the driver. For instance, signals received by the wireless receiver 207 from wireless transmitter 205 can provide a ground circuit causing the interlock relay switch to close. In some embodiments, the wireless receiver 207 causes the interlock control relay switch to close based on a signal received from the wireless transmitter 205 indicating the level of intoxicant in the user's breath is below a threshold. In various embodiments, when the interlock control relay switch is closed, power can flow to the starter motor of the vehicle and allow the vehicle to start when requested by the driver. In various embodiments, current is configured to flow to a starter motor of the vehicle only when the circuit control relay switch and the interlock control relay switch are closed. In various embodiments, the actuation coil of the interlock control relay selectively opens and closes the interlock control relay switch based on the signals received by the wireless receiver.

In the example of FIG. 5, the wireless relay system includes four electrical connectors 545 configured to connect the wireless relay system to the relay location in the under-hood relay box in the engine compartment of the vehicle. In this example, the circuit control relay 532 is electrically connected to three of the four electrical connectors 545 and the interlock control relay 534 is electrically connected to two of the four electrical connectors 545. As previously described, the plurality of electrical connectors 545 can be provided within a housing configured to mate directly with the socket connection of a particular OEM relay location. The electrical connectors 545 could also be provided within a cable and housing configuration.

Most four-pin automotive relays have their pins labeled according to the convention that 85 and 86 connect to opposite sides of a coil while 30 and 87 are opposite sides of a switch. In FIG. 5, the individual sockets within the relay location 542 are labeled 30, 85, 86 and 87 according to the pins they would receive. A five-pin relay could have a pin labeled 87a and be a second contact available at the same end of the switch as 87 to potentially connect to the opposite end 30 of the switch.

The wireless relay system can further include a horn control assembly. The horn control assembly can have a horn control relay 536 and a horn output 544. In some embodiments, the horn control relay 536 can have a horn control relay coil and a horn control relay switch. In various embodiments, the horn control relay is configured to activate a horn of the vehicle based on the signals received by wireless receiver 207. In various embodiments the horn control relay 536 is electrically connected to the wireless receiver 207 such that wireless receiver can cause the horn relay switch to close when the wireless receiver receives a signal from the wireless transmitter 205. In some embodiments, the wireless receiver 207 causes the horn control relay switch to close based on a signal received from the wireless transmitter 205 indicating the level of intoxicant in the user's breath exceeds a threshold or that a user has failed to supply a breath sample to detection unit 102. In various embodiments, power can flow through the horn control relay 536 to the horn output 544 when horn control relay switch is closed. In various embodiments, the horn output is operatively connected to a horn fuse 546 in the engine compartment relay box 540 of vehicle 100, such that triggering the horn output 544 with the horn control relay 536 triggers the horn of the vehicle. In some embodiments, the horn output taps into the horn fuse 546 of the vehicle with a fuse tap 550. In various embodiments, normal function and operation of the horn by the user is not inhibited and normal function of the horn fuse is not inhibited by the horn activation assembly. As a result, the driver is still able to activate the horn if desired while driving and the horn fuse still operates to protect the components of the OEM horn circuit.

In various embodiments, the wireless receiver 207 is electrically connected to the interlock control relay 534 and the horn control relay 536. As will be discussed in greater detail below, the wireless receiver 207 can be configured to be a multi-channel receiver, such that upon receiving a first signal from the wireless transmitter 205, the wireless receiver 207 can trigger the interlock control relay 534 (e.g., by sending a voltage to the interlock control relay) and upon receiving a second signal from the wireless transmitter 205, the wireless receiver 207 can trigger the horn control relay 536 (e.g., by sending a voltage to the horn control relay 536). In some embodiments, the first signal is at a different frequency than the second signal. In some embodiments, the first signal is a different duration than the second signal. In some embodiments, the first signal is at a different time interval than the second signal.

In some embodiments, the wireless receiver 207 is configured to receive three or more signals. In one example, upon receiving a third signal from the wireless transmitter 205, the wireless receiver 207 can trigger a light output to trigger the lights of the vehicle. In this example, the wireless receiver 207 is electrically connected to a light control circuit via a light output connection.

In some embodiments, the interlock control relay 534 can operate on a first channel configured to be triggered by a first signal from the wireless transmitter 205 and the horn control relay 536 can operate on a second channel configured to be triggered by a second signal from the wireless transmitter 205. The wireless receiver 207 can include a processor configured to control the output to the first and second channels, such that upon receiving the first signal from the wireless transmitter, the processor can trigger the interlock control relay via the first channel and upon receiving the second signal from the wireless transmitter, the processor can trigger the horn control relay via the second channel. In an alternative embodiment, the wireless relay system may include a first wireless receiver configured to control the interlock control relay upon receiving a first signal from the wireless transmitter, a second wireless receiver configured to control the horn control relay upon receiving a second signal from the wireless transmitter, and a third wireless receiver configured to control the light output upon receiving a third signal from the wireless transmitter.

Installation of the vehicle immobilization system depicted by FIGS. 2-5 is significantly less difficult than installing a traditional vehicle immobilization system in a vehicle, which may require cutting holes in the firewall, cutting and splicing wires, and routing wiring from the control system to various electrical systems within the vehicle. The vehicle immobilization system instead uses a wireless replacement relay system. This configuration makes use of both wireless communication components and wired connections to existing vehicle systems, thereby reducing the cost of installation of a vehicle immobilization system, reducing changes to the vehicle into which such a system is installed, and still providing a source of valuable information about the vehicle status to the immobilization system. The wired connections can, in some embodiments, be made primarily through fuse taps and other non-destructive connection methods to minimize the changes to the vehicle.

Figure 6:
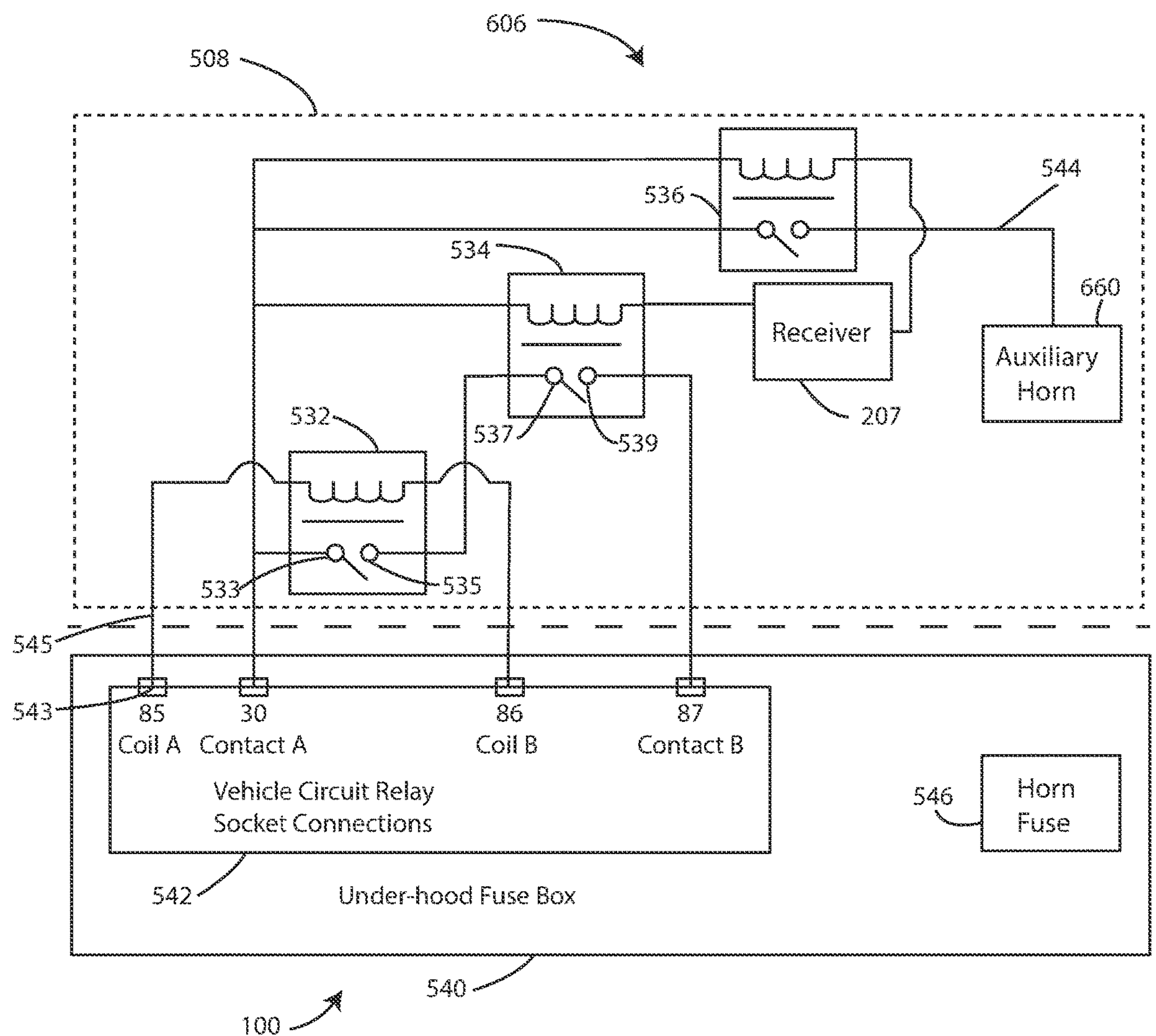
FIG. 6 is an exemplary schematic of another relay system including an auxiliary horn, in accordance with various embodiments herein.

Wireless Relay System with Auxiliary Horn (FIG. 6)

Referring now to FIG. 6, a schematic of a wireless relay system 606 having an alternative horn control assembly is shown interfacing with a vehicle in accordance with various embodiments herein. The wireless relay system 606 has most of the same components as shown in the wireless relay system 206 of FIG. 5, and those components have identical reference numbers to those used with respect to FIG. 5. However, wireless relay system 606 includes an auxiliary horn 660 which is provided as part of the vehicle immobilization system and is not part of the vehicle as provided by the original equipment manufacturer. The horn output 544 is connected to the auxiliary horn 660 and activates the auxiliary horn in the same possible ways as described herein for activating the vehicle horn with respect to the system of FIG. 5. As a result of the presence of the auxiliary horn 660, there is no need for the wireless relay system 606 to interface with the horn fuse of the vehicle. As a result, the installation of wireless relay system 606 is further simplified.

The auxiliary horn 660 can be positioned within the wireless relay housing 508, as shown schematically in FIG. 6, or can be positioned outside of the wireless relay housing 508. For example, the auxiliary horn 660 can be secured to an outside surface of the wireless relay housing 508 or to a structure of the vehicle, such as an outside wall of the relay box 540 or other structures.

Figure 7:
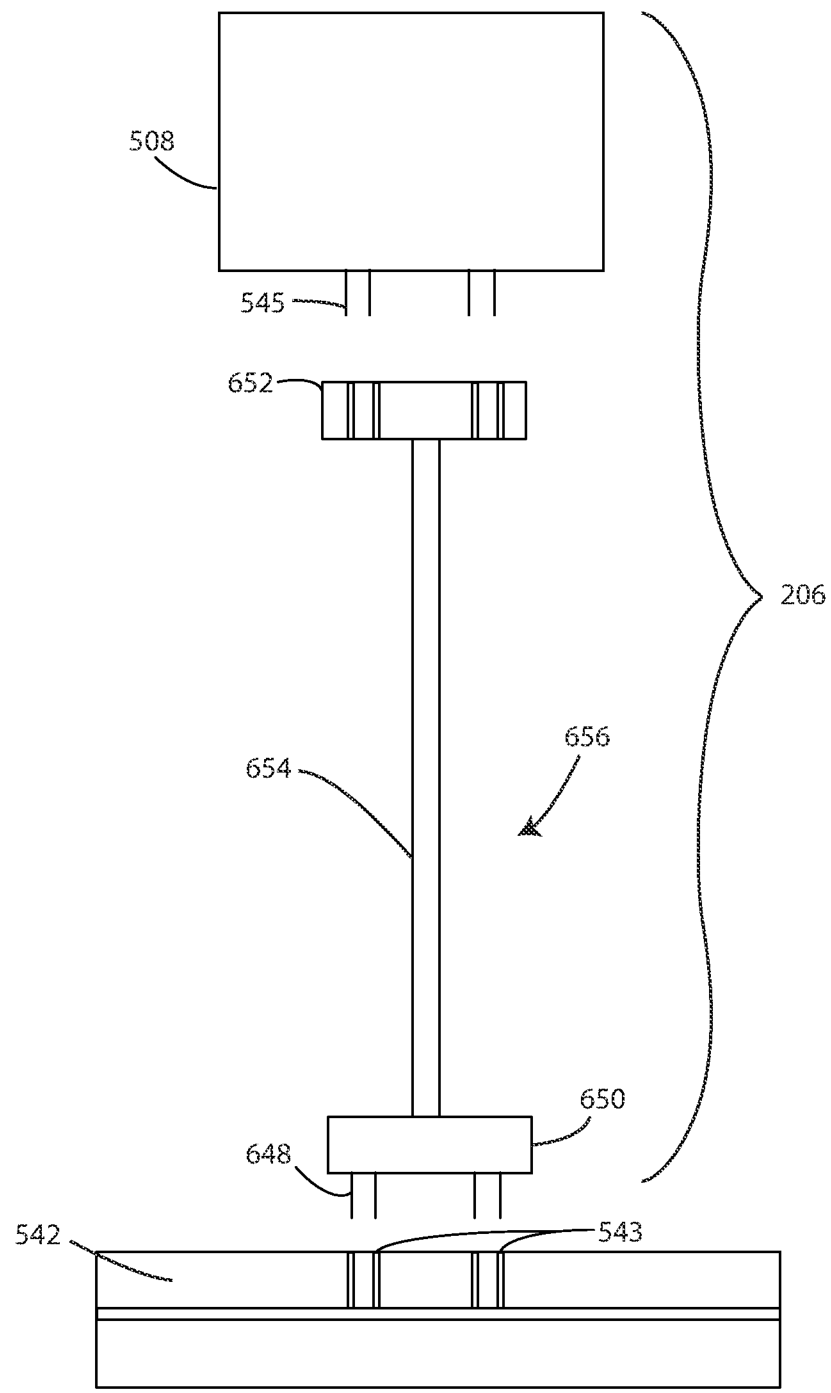
FIG. 7 is a schematic of a wireless relay system interfacing with a vehicle in accordance with various embodiments herein.
Figure 8:
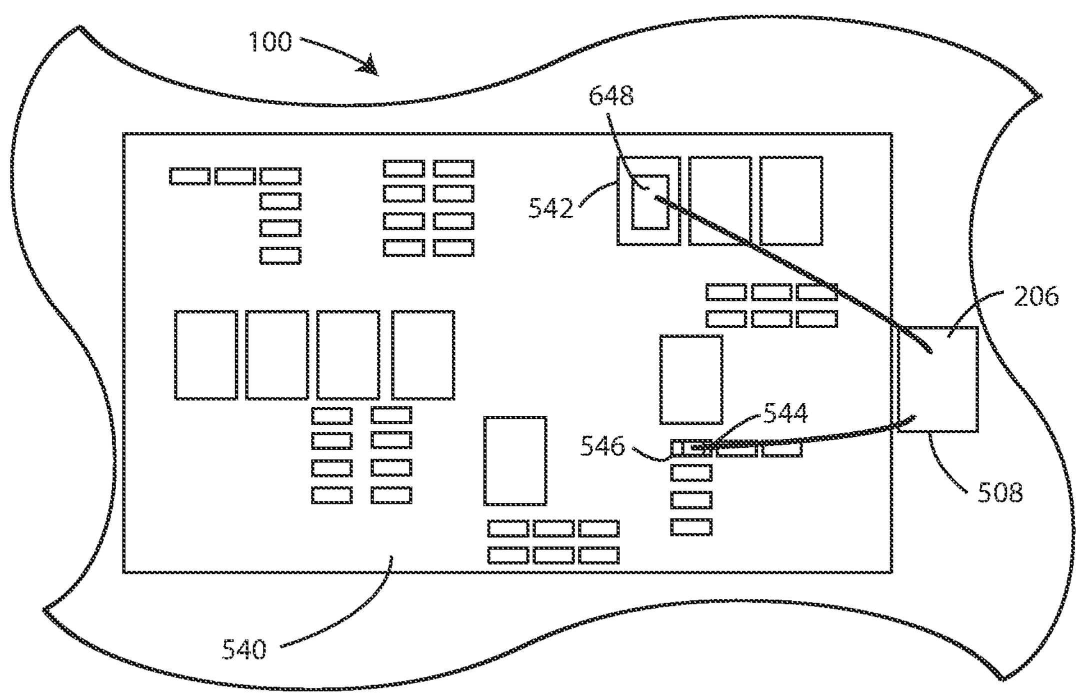
FIG. 8 is a schematic of a wireless relay system interfacing with a vehicle in accordance with various embodiments herein.

Connections to Under-Hood Vehicle Relay Box (FIGS. 7 and 8)

Referring now to FIG. 7, a schematic of a wireless relay system 206 interfacing with a vehicle is shown in accordance with various embodiments herein. In various embodiments, the wireless relay system 206 is configured to attach to the vehicle at the location 542 of an original equipment manufacturer relay of the vehicle 100, such as the starter relay location. In various embodiments, such as shown in the schematic view of FIG. 5, the wireless relay system 206 is connected to the relay location 542 in an engine compartment relay box 540 in the engine compartment 201 of the vehicle 100. The wireless relay system 206 can plug directly into the relay location 542 with electrical connectors 545. Alternatively, as shown in FIG. 7, the wireless relay system 206 can include a relay adaptor harness 656 and can connect to the relay location 542 using the relay adaptor harness 656. The relay adaptor harness 656 can have a plurality of electrical connectors 648 configured to be plugged into a plurality of sockets 543 of the relay location 542 at a first relay adaptor connector 650 at a first end of relay adaptor harness. In some embodiments, the plurality of electrical connectors 648 are arranged to protrude from the relay adaptor connector 650 in a configuration compatible to directly plug into the sockets 543 of a particular OEM relay location, such as the starter relay location. The relay adaptor harness 656 can have a second relay adaptor connector 652 at a second end configured to connect to the wireless relay system 206. A length of connector cable 654 connects the first relay adaptor connector 650 at the first end to the second relay adaptor connector 652 at the second end. The length of connector cable 654 can be sized to allow the first relay adaptor connector 650 to connect to the relay location 542 inside of the vehicle relay box, while the second relay adaptor connector 652 is positioned outside of the vehicle relay box. The wireless relay housing 508 of the wireless relay system 206 can be secured to a structure of the vehicle, such as an outside wall of the relay box 540 or other structures.

A relay adaptor harness 656 can come in various shapes and configurations. The shape and configuration of the relay adaptor harness 656 can be selected based on which type of relay adaptor connector will fit in the relay location 542 of a particular vehicle 100. In the example of FIG. 7, the relay adaptor harness 656 has a first relay adaptor connector 650 which has four electrical connectors 648, or pins 648, configured to mate with four sockets 543 of the relay location 542. However, additional relay adaptor connectors with different numbers of terminals, different configurations of terminals, or both are known in the art and can be selected based on their compatibility with a particular relay location 542.

In some examples, the relay adaptor harness 656 can be plugged into and removed from the relay location without damaging or modifying the relay location. In some examples, the relay adaptor harness 656 can also be connected to and disconnected from the electrical connectors 545 of the wireless relay system 206 without damaging or modifying any part of the wireless relay system. In various examples, one or more of these connections can be made easily, using hands of the installer, and without tools. Alternatively, the relay adaptor harness 656 can be permanently connected to the wireless relay housing 508.

Referring now to FIG. 8, a schematic of a wireless relay system 206 interfacing with a vehicle 100 is shown in accordance with various embodiments herein. In various embodiments, the circuit control relay 532, interlock control relay 534, and horn control relay 536 are all disposed within the wireless relay housing 508. In various embodiments, the wireless relay housing 508 is configured to be disposed outside of the engine compartment relay box 540 and is configured to be operatively connected to the engine compartment relay box with the electrical connectors 545 or via relay adaptor harness 656. In an embodiment, the relay adaptor harness 656 is configured to be plugged into the relay location 542 of engine compartment relay box 540. In various embodiments, circuit control relay 532 is configured to electrically connect to one or more of the pluralities of terminals 648 (not shown in FIG. 8) at first relay adaptor connector 650 at the first end of the relay adaptor harness 656.

In various embodiments, the horn control relay 536 is configured to electrically connect to a horn fuse 546 disposed in the engine compartment relay box 540 with horn output 544. In an exemplary embodiment, the wireless relay housing 508 is disposed outside of the engine compartment relay box 540 and is configured to connect to the relay location 542 with relay adaptor harness 656 and to the horn fuse 546 with horn output 544. In one example, the horn output 544 connects to the horn fuse 546 using fuse tap 550. The optional horn output 544 is shown in FIG. 8 but is not shown in FIG. 7. The horn output 544 can extend from the wireless relay housing 508 and terminate in a connector, such as a fuse tap 550. In the alternative, the horn output 544 can include a connector on the wireless relay housing 508 that is configured to connect to a horn connector harness like relay adaptor harness 656. If provided, the horn connector harness can include a connector for interfacing with the horn fuse 546, such as a fuse tap 550.

In a further example, the wireless relay system 206 is installed in the vehicle, enabling the control system 104 to selectively allow operation of the wireless relay system 206. The wireless relay system 206 is installed by removing one or more of the OEM vehicle relays and replacing them with the wireless relay system 206. In one example, this step does not require the use of any tools and can be performed with the installer's hands. The installer identifies the appropriate standard relay for removal, pulls the standard relay out of the vehicle, which leaves an unoccupied relay receptacle in the vehicle. The installer then pushes a first end of relay adaptor harness 656 into the relay receptacle of the vehicle. With the wireless relay housing 508 connected to the second end of the relay adaptor harness 656, the operator can close the engine compartment relay box 540 with wireless relay housing 508 disposed outside the relay box 540. The operator can then place a tamper proof seal around the wireless relay housing 508, the engine compartment relay box 540, or both.

Alternatively, the installer connects each of the electrical connectors 545 with a socket in the OEM vehicle relay location. In one example, the electrical connectors 545 are sufficient long so that the wireless relay housing 508 can be positioned outside of the relay box 540. FIG. 8 illustrates the wireless relay housing 508 positioned outside of the relay box 540 and secured to an outside surface of a sidewall of the relay box 540. In another configuration, the wireless relay system 206 is small enough to be enclosed within the engine compartment relay box 540.

Alternative Wireless Relay System

In some embodiments, the wireless relay system can incorporate the OEM vehicle relay as the circuit control relay or the interlock control relay. In this embodiment, the OEM vehicle relay is removed from its relay location and placed in the wireless relay housing to serve as either the circuit control relay or the interlock control relay.

Figure 9:
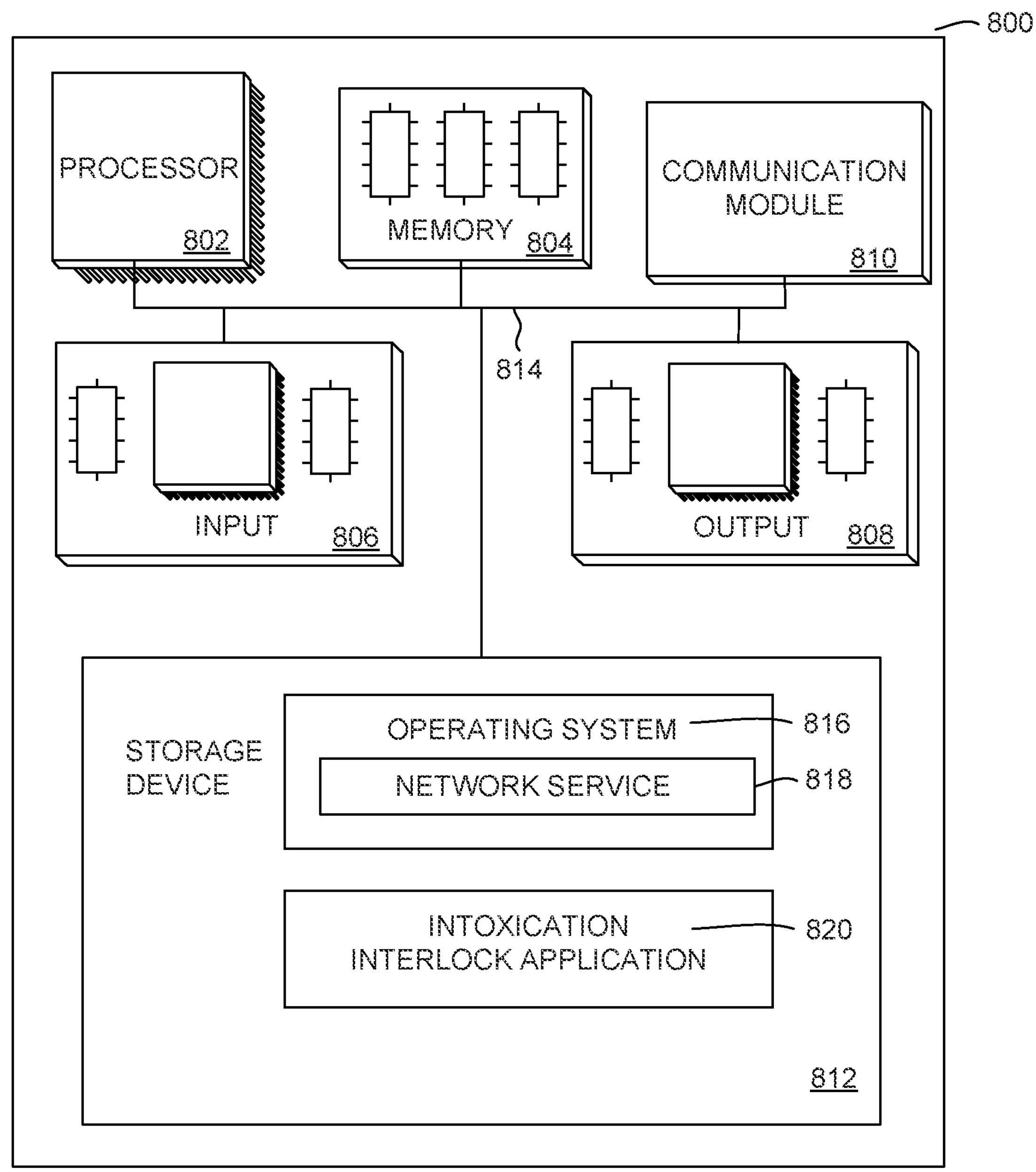
FIG. 9 is a computerized intoxication interlock system, as may be used to practice various examples described herein.

Computer System (FIG. 9)

Referring now to FIG. 9 a computerized vehicle immobilization system or component of a computerized vehicle immobilization system, is shown in accordance with various examples herein. FIG. 9 illustrates only one example of computing device 800, and other computing devices 800 may be used in other embodiments. Although computing device 800 is shown as a standalone computing device, computing device 800 may be any component or system that includes one or more processors or another suitable computing environment for executing software instructions in other examples and need not include all of the elements shown here. A control system, wireless relay system, and detection unit as described herein are examples of components that can be implemented using computing devices such as computing device 800.

As shown in the specific example of FIG. 8, computing device 800 includes one or more processors 802, memory 804, one or more input devices 806, one or more output devices 808, one or more communication modules 810, and one or more storage devices 812. Computing device 800, in one example, further includes an operating system 816 executable by computing device 800. The operating system includes in various examples services such as a network service 818. One or more applications, such as an intoxication interlock application 820 are also stored on storage device 812 and are executable by computing device 800.

Each of components 802, 804, 806, 808, 810, and 812 may be interconnected (physically, communicatively, and/or operatively) for inter-component communications, such as via one or more communications channels 814. In some examples, communication channels 814 include a system bus, network connection, inter-processor communication network, or any other channel for communicating data. Applications such as intoxication interlock application 820 and operating system 816 may also communicate information with one another as well as with other components in computing device 800.

Processors 802, in one example, are configured to implement functionality and/or process instructions for execution within computing device 800. For example, processors 802 may be capable of processing instructions stored in storage device 812 or memory 804. Examples of processors 802 include any one or more of a microprocessor, a controller, a digital signal processor (DSP), an application specific integrated circuit (ASIC), a field-programmable gate array (FPGA), or similar discrete or integrated logic circuitry.

One or more storage devices 812 may be configured to store information within computing device 800 during operation. Storage device 812, in some examples, is known as a computer-readable storage medium. In some examples, storage device 812 comprises temporary memory, meaning that a primary purpose of storage device 812 is not long-term storage. Storage device 812 in some examples includes a volatile memory, meaning that storage device 812 does not maintain stored contents when computing device 800 is turned off. In other examples, data is loaded from storage device 812 into memory 804 during operation. Examples of volatile memories include random access memories (RAM), dynamic random-access memories (DRAM), static random-access memories (SRAM), and other forms of volatile memories known in the art. In some examples, storage device 812 is used to store program instructions for execution by processors 802. Storage device 812 and memory 804, in various examples, are used by software or applications running on computing device 800 such as intoxication interlock application 820 to temporarily store information during program execution.

Storage device 812, in some examples, includes one or more computer-readable storage media that may be configured to store larger amounts of information than volatile memory. Storage device 812 may further be configured for long-term storage of information. In some examples, storage devices 812 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 800, in some examples, also includes one or more communication modules 810. Computing device 800 in one example uses communication module 810 to communicate with external devices via one or more networks, such as one or more wireless networks. Communication module 810 may be a network interface card, such as an Ethernet card, an optical transceiver, a radio frequency transceiver, or any other type of device that can send and/or receive information. Other examples of such network interfaces include Bluetooth, 3G, 4G, 5G, Wi-Fi radios, Near-Field Communications (NFC), and Universal Serial Bus (USB). In some examples, computing device 800 uses communication module 810 to wirelessly communicate with an external device such as via public network such as the Internet.

Computing device 800 also includes in one example one or more input devices 806. Input device 806, in some examples, is configured to receive input from a user through tactile, audio, or video input. Examples of input device 806 include a touchscreen display, a mouse, a keyboard, a voice responsive system, video camera, microphone, or any other type of device for detecting input from a user. Sensors, such as temperature sensors or vibration sensors, can also be included in the device 800 or communicate with the device 800 to provide information to a processor. For example, a vibration sensor or temperature sensor can be configured to provide information about a vehicle engine, such as whether or not it is running. A wireless transceiver can act as an input device 806 when it is configured to provide feedback confirming that instructions are received or actions are executed.

One or more output devices 808 may also be included in computing device 800. Output device 808, in some examples, is configured to provide output to a user using tactile, audio, or video stimuli. Output device 808, in one example, includes a display, a sound card, a video graphics adaptor card, or any other type of device for converting a signal into an appropriate form understandable to humans or machines. Additional examples of output device 808 include a speaker, a light-emitting diode (LED) display, a liquid crystal display (LCD), tactile vibration emitter, or any other type of device that can generate output to a user.

Computing device 800 may include operating system 816. Operating system 816, in some examples, controls the operation of components of computing device 800, and provides an interface from various applications such intoxication interlock application 820 to components of computing device 800. For example, operating system 816, in one example, facilitates the communication of various applications such as intoxication interlock application 820 with processors 802, communication unit 810, storage device 812, input device 806, and output device 808. Applications such as intoxication interlock application 820 may include program instructions and/or data that are executable by computing device 800. As one example, intoxication interlock application 820 may include instructions that cause computing device 800 to perform one or more of the operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

Figure 10:
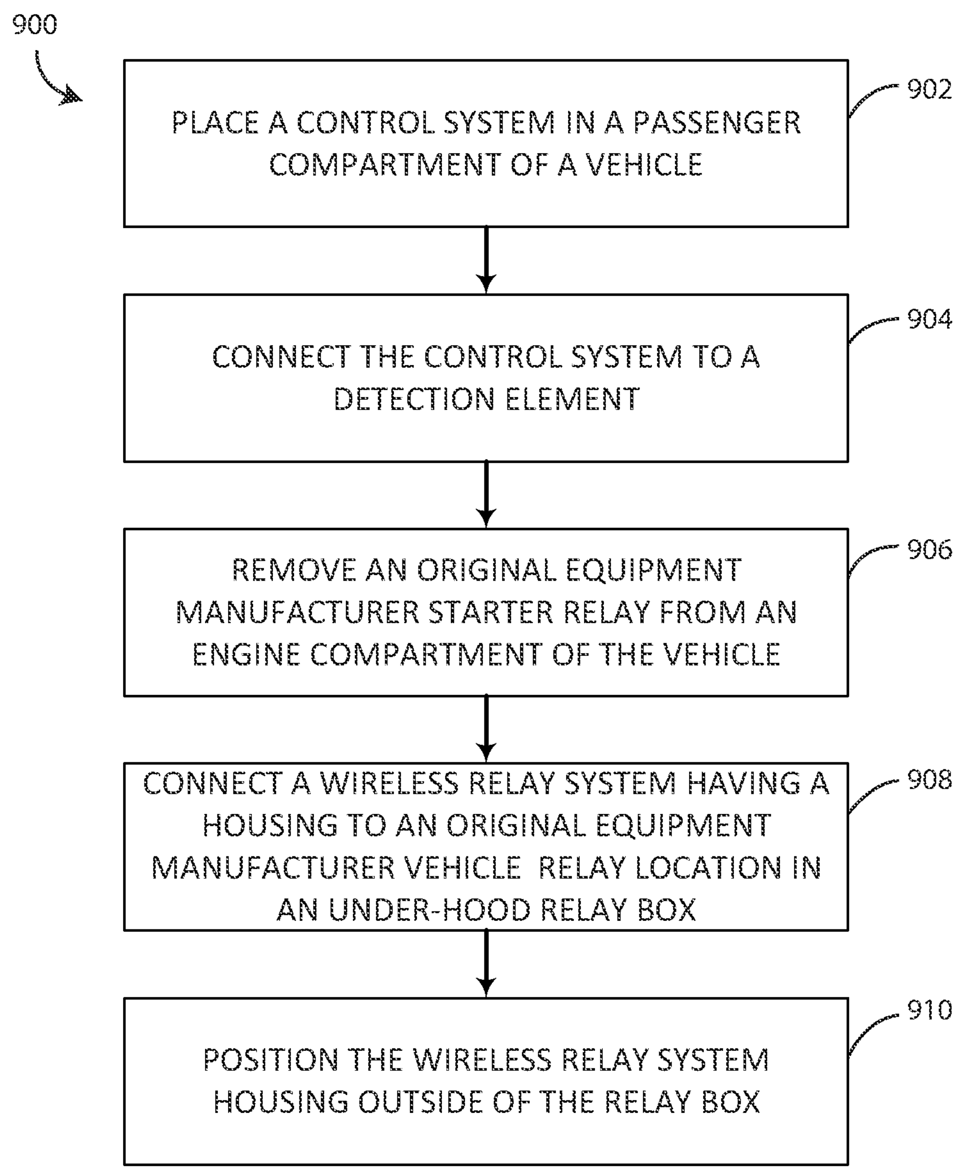
FIG. 10 is a is a flowchart illustrating an example method of installing a vehicle immobilization system in accordance with various embodiments herein.

Methods of Installing a Vehicle Immobilization System (FIG. 10)

Many different methods are contemplated herein, including, but not limited to, methods of making, methods of using, and the like. Aspects of system/device operation described elsewhere herein can be performed as operations of one or more methods in accordance with various embodiments herein.

Referring now to FIG. 10, a flowchart of a method of installing a vehicle immobilization system in a vehicle is shown in accordance with various examples herein.

The method 900 at step 902 can include placing a control system in a passenger compartment of the vehicle. In various embodiments, the control system can include a wireless transmitter configured to transmit signals. In various embodiments, the control system is under the dash of the vehicle or within the center console of the vehicle. In some embodiments, the control system is placed in the vehicle such that control system is concealed from the view of a user.

The method at step 904 can include connecting the control system to a detection unit such that the control system is configured to receive an input signal from the detection unit indicating a level of intoxicant. The detection unit can be connected to the control system through a wired connection (e.g., a RS232 serial connection or a USB connection). Alternatively, the detection unit can be connected to the control system by a wireless connection, a wireless radio frequency connection, a wireless Bluetooth connection, or other suitable connection. In an alternative embodiment, one or more components of the control system can be incorporated within the handheld detection unit.

In some embodiments the method can further include connecting a power input of the control system to a constant power source in a cabin relay box of the vehicle. In some embodiments, the power input is configured to connect to the fuse box in the passenger compartment of the vehicle. In some embodiments, the power input 316 is electrically connected to a fuse of a vehicle, such as a 12 V constant power fuse in the fuse box in the passenger compartment of the vehicle 100, using a fuse tap, or the like.

In some embodiments the method can further include connecting an ignition input of the control system to a vehicle system for gathering information about ignition status, such that the ignition input is configured to send an ignition status of the vehicle to the control system. One example of such a system is an ignition harness of the vehicle. In some embodiments, the ignition input is configured to be electrically connected to a vehicle system, such as the ignition harness of the vehicle, with an insulation displacement connector, a tap connector, or the like.

In some embodiments the method can further include connecting a light output to a hazard light switch of the vehicle, such that the light output is configured to control one or more lights of the vehicle. In some embodiments, the light output is operatively connected to the hazard light switch with an insulation displacement connector, a tap connector, or the like. By tapping into the output of the hazard light control switch, the light output controls an input of a body control module of the vehicle and can trigger the hazard lights of the vehicle upon receiving a command from the control system. On older cars without a body control module, the light output can control a flasher module, flasher relay, or other electrical circuit controlling vehicle lights.

Alternatively, instead of connecting a light output to a hazard light switch of the vehicle, the method can further include providing a separate lighting device as a light output of the system. The light output can be attached by a wired connection to the control system housing, or can be controlled by a wireless connection. The method can include attaching the lighting device to a structure of the vehicle.

The method at step 906 can include removing an original equipment manufacturer relay from an engine compartment of the vehicle. This step can comprise pulling the original equipment manufacturer relay from the relay location in the engine compartment relay box.

The method can further include providing a wireless relay system. In various embodiments, the wireless relay system can include a wireless relay housing, a circuit control relay within the wireless relay housing, an interlock control relay connected to the circuit control relay and within the wireless relay housing, and a wireless receiver connected to the interlock control relay and configured to receive the signals from the wireless transmitter.

The method at step 908 can include connecting the wireless relay system to an original equipment manufacturer relay location in an under-hood relay box in the engine compartment of the vehicle. In various embodiments, this step includes electrically connecting the circuit control relay of the wireless relay system to portions of an original equipment manufacturer relay location in an under-hood relay box in the engine compartment of the vehicle. In various embodiments, this step includes electrically connecting the interlock control relay to portions of the original equipment manufacturer relay location in the under-hood relay box in the engine compartment of the vehicle. In some embodiments, the wireless relay system can be connected directly in place of the original equipment manufacturer relay. Alternatively, the wireless relay system can be connected to the original equipment manufacturer relay location using a relay adaptor connector.

The method at step 910 can include positioning wireless relay housing outside of the under-hood relay box in the engine compartment of the vehicle. In some embodiments, the wireless relay housing connected to a relay adaptor connector, the operator can close the engine compartment relay box with wireless relay housing disposed outside the relay box. The operator can then place a tamper proof seal around the wireless relay housing, the engine compartment relay box 540, or both. In some embodiments, the wireless relay system can also include a horn control relay disposed in the wireless system housing and configured to activate a horn of the vehicle based on the radio frequency signals received by the radio frequency receiver. In some embodiments the method can further include connecting the horn control relay to a horn activation fuse location of the vehicle.

In some embodiments, wireless relay system can include an auxiliary horn that is controlled by the horn control relay, where the auxiliary horn is separate from the vehicle's horn and is provided as a part of the vehicle immobilization system. If the auxiliary horn is not located within the wireless relay housing 508, then the method can include attaching the auxiliary horn to an outside surface of the wireless relay housing 508 or to a vehicle structure.

Figure 11:
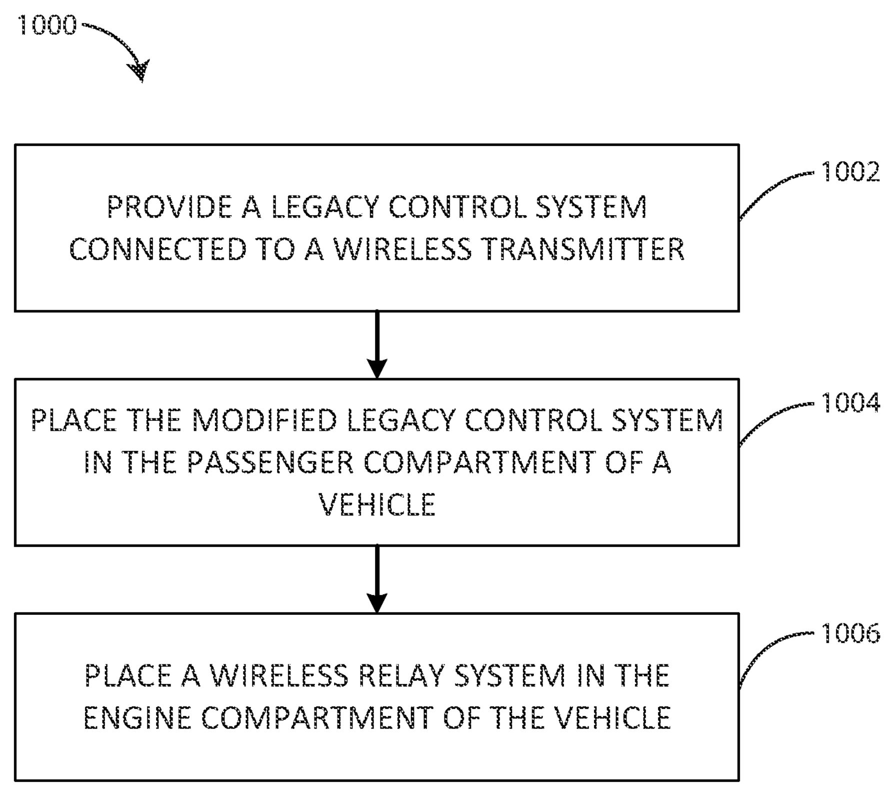
FIG. 11 is a is a flowchart illustrating an example method of repurposing a legacy control system in accordance with various embodiments herein.

Method for Installing a Vehicle Immobilization System that Includes Both a Legacy Control System and a Wireless Relay System Referring now to FIG. 11, a flowchart illustrating an example method of repurposing a legacy control system (such as the control system depicted in FIG. 4) for use with a wireless relay system is shown in accordance with various examples herein. Many existing ignition interlock control systems (referred to as legacy control systems herein) are designed for wired communication with one or more systems of a vehicle. Some examples of legacy control systems are described in U.S. Pat. No. 7,934,577, while other examples of legacy control systems are described in U.S. Pat. No. 10,604,011, which are both incorporated herein by reference. As discussed above, the benefits of a wireless relay system include reduced cost of installation of a vehicle immobilization system, reduced installation time, and reduced changes to the vehicle into which the system is installed. Legacy control systems typically have many of the same components as are found in a control system housing 308 as describe herein. Therefore, it can be advantageous to repurpose a legacy control system for wireless communication with one or more vehicle systems.

The method 1000 at step 1002 can include providing a legacy control system connected to a wireless transmitter. As discussed above, legacy control systems in circulation are designed for wired communication with one or more systems of a vehicle. The legacy control system often includes a processor operable to perform various functions. The legacy control system also typically includes a cellular monitoring system, a camera, a memory configured to store instructions for the processor, and a plurality of outputs. The legacy control system is typically configured to connect to a detection unit and to one or more systems of the vehicle.

The legacy control system can be connected to a wireless transmitter 205 such that the legacy control system is configured to transmit wireless signals to a wireless relay system. In some embodiments, the wireless transmitter is connected to the legacy control system such that the wireless transmitter is disposed outside of the housing of the legacy control system. Alternatively, the wireless transmitter can be disposed within the housing of the legacy control system. New firmware can be provided to the memory of the legacy control system to control the wireless transmitter, though this is not necessary in all embodiments.

The method at step 1004 can include placing the modified legacy control system in the passenger compartment of a vehicle. The legacy control system can have a plurality of outputs as depicted by the example of FIG. 4. The legacy control system can be placed in the vehicle and connected to the vehicle in a similar manner as discussed for the control system in method 900. Since the modified legacy control system is fitted with a wireless transmitter, there would be no need to go through the firewall with wiring to control the starter relay of the vehicle.

In some embodiments, the legacy control system may contain a high-current relay configured to be hardwired to the starter circuit of the vehicle and to interrupt the current to the starter relay unless an intoxication test is passed. For such embodiments, the method can further comprise rewiring the legacy control system such that the signal from the processor of the legacy control system is sent to the wireless transmitter rather than to the high-current relay. In alternative embodiments, the internal circuitry of the legacy control system is not modified, and the output of the high current relay can be routed to the wireless transmitter such that the high-current relay is configured to trigger the wireless transmitter.

The method at step 1006 can include placing the wireless relay system in the engine compartment of a vehicle. The wireless relay system can be the wireless relay system shown and described in FIGS. 5-7. The wireless relay system can be placed in the vehicle and connected to the vehicle in a similar manner discussed in method 900.

Figure 12:
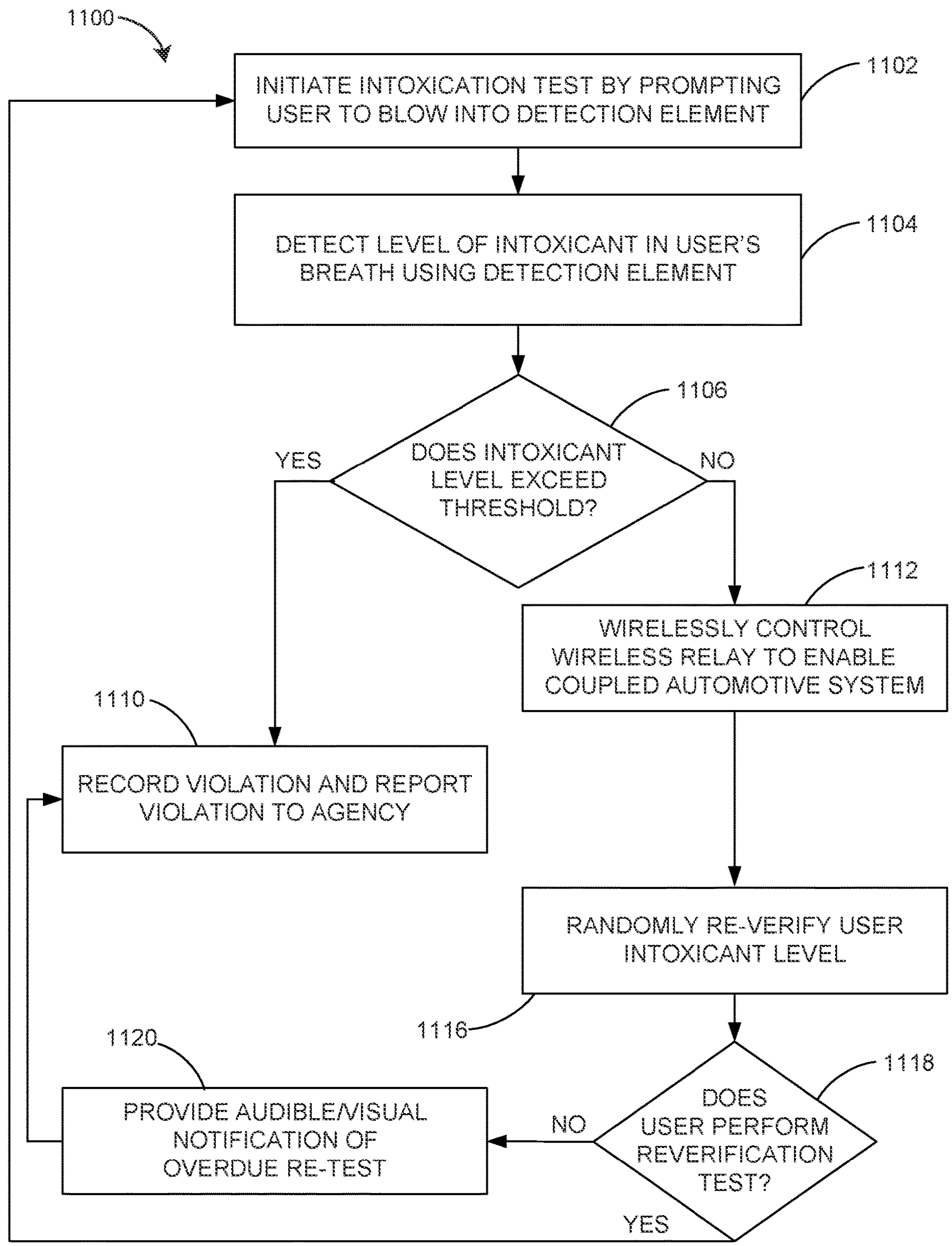
FIG. 12 is a is a flowchart illustrating an example method of operating a vehicle immobilization system in accordance with various embodiments herein.

Method of Use of a Vehicle Immobilization System (FIG. 12)

Referring now to FIG. 12, a flowchart illustrating an example method 1100 of operating and vehicle immobilization system is shown in accordance with various examples herein. At the start, the vehicle is in a disabled or inactive state. The process of enabling the vehicle starts by the vehicle immobilization system prompting the user to blow into the vehicle immobilization system's detection unit at 1102, and the detection unit detects the level of an intoxicant such as alcohol in the user's breath at 1104. The system then compares the detected intoxicant level to an allowable threshold at 1106 and determines whether the intoxicant level exceeds the threshold. If the threshold is exceeded at 1106, the vehicle will not start because no signal is sent to the wireless relay system to enable a coupled automotive system. The wireless relay system prevents power from flowing to one or more vehicle systems. For instance, upon exceeding the threshold at step 1106, one or more wirelessly controlled relays connected to the vehicle relay locations, such as the starter relay location, will remain open, preventing power from flowing to the starter motor of the vehicle or other vehicle system. The vehicle is prevented from starting or running because the transmitter has not sent a transmission that causes a relay to close.

In some embodiments, the test result over a threshold is recorded. In some embodiments, an intoxication violation record is also then recorded at 1110, such as by storing a record of the violation in the vehicle immobilization system or reporting the violation to a monitoring agency or authority.

If the threshold is not exceeded at 1106, the vehicle immobilization system wirelessly controls the wireless relay system to enable the coupled automotive system at 1112. In various embodiments, the control system signals the vehicle to enable the vehicle to start, such as by enabling one or more vehicle systems that have been previously disabled by signaling wireless relay system to enable the relay to operate normally. For example, upon not exceeding the threshold at 1106, the interlock control relay 534 of FIG. 5, which is connected to the starter motor via the relay location in the vehicle, will close, allowing power to flow to the starter motor of the vehicle and the vehicle to be started by the driver.

Once normal operation of the vehicle has been enabled as a result of successful completion of an intoxication interlock test, the vehicle immobilization system randomly re-tests or re-verifies the user's sobriety at 1116. This safeguards against using a sober friend to pass a test before an intoxicated user begins driving, except where the sober friend is also a passenger in the vehicle. If the user performs the re-verification test at 1118, the intoxication interlock process is repeated at 1102, except that the current state of the vehicle when the test starts will be an enabled or operable state. If the user does not perform the re-verification test at 1118 when prompted or provides breath sample exceeding the intoxicant level threshold, the vehicle immobilization system provides an audible and/or visible notification that the re-verification test is overdue at 1120, such as by honking the vehicle's horn, turning down the radio, flashing the hazard lights of the vehicle, a combination of these controls, or other vehicle control actions. If the re-verification test is still not performed in a timely manner, failure to complete the re-verification test is recorded as a violation at 1110, and in a further example is reported to a monitoring agency or authority.

Alternatives to Replacing the OEM Vehicle Relay at the Starter Relay Location

The vehicle immobilization system described herein includes a wireless relay system that is electrically connected to a relay location in an under-hood relay box, such as the starter relay location. Instead of attaching to a starter relay location, it is also possible to immobilize a vehicle by connecting to a different relay location, such as a relay for a fuel pump, a transmission system, transmission engagement circuit, an electric motor engagement system, or other vehicle system. An electric motor engagement system sends a signal indicating that the electric motor is engaged. It is also possible to immobilize the vehicle by interrupting a necessary vehicle validation condition, such as a brake pedal engagement circuit that sends a signal indicating that the brake pedal is depressed. This is particularly applicable in an electric vehicle that does not include a starter motor or fuel pump. The wireless relay system can be attached to a relay location for a vehicle validation condition. The wireless relay system can alternatively be attached to a non-relay location related to another vehicle system that is used upon a vehicle start, such as the vehicle systems mentioned herein.

Wireless Communication Options

The wireless transmitter 205 can be configured to transmit continuous signals, discrete signals, pulsed signals, or any combination thereof. In various examples, the wireless transmitter 205 is a transmit-only component and cannot receive wireless communication. In various embodiments, the wireless transmitter 205 is configured to transmit signals in the radio frequency range. In some embodiments, the wireless transmitter 205 is configured to transmit signals at one or more frequencies having substantial transmission through physical obstructions (e.g., the firewall of a vehicle). In some embodiments, the operating frequency of the wireless transmitter 205 can be greater than or equal to 260 megahertz (MHz), 295 MHZ, 329 MHz, 364 MHZ, 398 MHZ, or 433 MHz. In some embodiments, the operating frequency of the wireless transmitter 205 can be less than or equal to 929 MHz, 830 MHZ, 731 MHz, 631 MHz, 532 MHz, or 433 MHz. In some embodiments, the operating frequency of the wireless transmitter 205 can fall within a range of 260 MHz to 929 MHz, or 295 MHz to 830 MHz, or 329 MHz to 731 MHz, or 364 MHz to 631 MHz, or 398 MHz to 532 MHz, or can be about 433 MHz. In some embodiments, the wireless transmitter 205 can transmit signals at a bandwidth greater than or equal to 500 kHz, 1000 kHz, 1500 kHz, 2000 kHz, 2500 kHz, or 3000 kHz, or can be an amount falling within a range between any of the foregoing.

In various embodiments, the wireless transmitter 205 can be a multi-channel transmitter, such that the wireless transmitter is configured to transmit two or more distinct signals. Alternatively, the control system 104 can have two or more wireless transmitters 205. In some embodiments, the wireless transmitter 205 is configured to transmit signals at two distinct frequencies. In an exemplary embodiment, the wireless transmitter can transmit a first signal at about 315 MHz and a second signal at about 434 MHz. In various embodiments, the wireless receiver 207 is a wireless transceiver, capable of both receiving and transmitting wireless signals.

In various examples, the wireless receiver 207 receives signals in the radio frequency range. In various examples, the wireless receiver 207 is a receive-only component and is not capable of transmitting wireless signals. The wireless receiver 207 can be configured to receive continuous signals, discrete signals, pulsed signals, or any combination thereof. In various embodiments, the wireless receiver 207 is configured to receive signals in the radio frequency range. In some embodiments, the operating frequency of the wireless receiver 207 can be greater than or equal to 260 MHZ, 295 MHz, 329 MHZ, 364 MHZ, 398 MHz, or 433 MHz. In some embodiments, the operating frequency of the wireless receiver 207 can be less than or equal to 929 MHz, 830 MHZ, 731 MHz, 631 MHz, 532 MHz, or 433 MHz. In some embodiments, the operating frequency of the wireless receiver 207 can fall within a range of 260 MHz to 929 MHZ, or 295 MHz to 830 MHz, or 329 MHz to 731 MHz, or 364 MHz to 631 MHz, or 398 MHz to 532 MHz, or can be about 433 MHz. In some embodiments, the wireless receiver 207 can receive signals at a bandwidth greater than or equal to 500 kHz, 1000 kHz, 1500 kHz, 2000 kHz, 2500 kHz, or 3000 kHz, or can be an amount falling within a range between any of the foregoing.

In various embodiments, the wireless receiver 207 can be a multi-channel receiver, such that the wireless receiver 207 is configured to receive two or more distinct signals from the wireless transmitter 205. Alternatively, the wireless relay system 206 can have two or more wireless receivers 207. In some embodiments, the wireless receiver 207 is configured to receive signals at two distinct frequencies. In an exemplary embodiment, the wireless receiver 207 can receive a first signal at about 315 MHz and a second signal at about 434 MHz from the wireless transmitter 205.

In various embodiments, the wireless transmitter 205 and wireless receiver 207 are both wireless transceivers, capable of both receiving and transmitting wireless signals. In various embodiments, wireless transceivers of the control system and the wireless relay system communicate via Bluetooth, NFC, Wi-Fi, such as up to 5000 MHz, or another suitable wireless protocol. The term "Bluetooth" is used herein to indicate that a component is capable of communicating according to a standard for wireless exchange of data over short distances, such as by using short-wavelength UHF radio waves in the industrial, scientific and medical (ISM) band from 2.4-2.485 Gigahertz. Standards for Bluetooth communication are managed by the Bluetooth Special Interest Group.

In various embodiments, the wireless transmitter 205 is configured to transmit a pulsed signal where each pulse is of a limited duration, such as a half-second, one second. In various embodiments, the wireless transmitter 205 is configured to transmit a pulsed signal where each pulse is of a limited duration, such as $1/10^{th}$ of a second, ¼ second, ½ second, ¾ second, 1 second, or ranges between these values. In various embodiments, the wireless transmitter 205 is configured to transmit using a duty cycle so that transmission is occurring only during a portion of each transmission time period, such as 10%, 20%, 30%, 40%, 50%, 60%, 70%, 80%, 90%, or ranges between these values.

Detection Unit Options

Throughout the application, a detection unit having a detection element has been described as a part of a vehicle immobilization system. The detection unit has sometimes been described as an alcohol breath detector which a user blows into, causing the breath sample to enter a fuel cell detector element. In alternative methods and systems, different detection units and detection elements can be used.

For example, instead of or in addition to a fuel cell detection element, the system can include one or more of a complementary metal oxide semiconductor (CMOS) sensor, a metal oxide semiconductor (MOS) sensor, a semiconductor sensor, and an infrared (IR) sensor.

In some examples, detection elements can be used that provide a continuous signal. Detection elements for alcohol that can provide a continuous signal are a complementary metal oxide semiconductor (CMOS) sensor, a metal oxide semiconductor (MOS) sensor, a semiconductor sensor, and an infrared (IR) sensor. These detection elements and detection elements that provide a continuous signal do not need to wait for a predetermined time period after receiving a gas sample to provide a gas alcohol content reading that is considered accurate. In contrast, fuel cell detection elements operate on a fixed volume gas sample when measuring alcohol content.

In other examples, instead of testing a user's breath for alcohol, the detection unit can test the user's breath for *cannabis*, opioids, or other intoxicants. In other examples, instead of testing the user's breath for an intoxicant, the detection unit can be a transdermal device that is in contact with the user's skin and detects a level of alcohol, *cannabis*, opioids, or other intoxicants in a user. Transdermal sensors can be part of a wrist-worn device, an ankle-worn device, a device attached to another part of the user's body, or a device embedded in a steering wheel or another part of the vehicle. If a transdermal unit is used as the detection unit, then instead of prompting the user to provide a breath sample, the system can ask the user to bring the detection unit into contact with the user's skin. If the detection unit is already in contact with the user's skin, then the system can simply take the measurement and determine if there is an intoxicant present above a threshold.

These alternatives for a detection unit and a detection element can be used with each of the systems described herein instead of the breath detection element that is otherwise described. These examples show how a vehicle immobilization system incorporating features such as the wireless relay system may operate to selectively restrict operation of a vehicle, depending on the result of an intoxication test. The systems and methods presented here may be implemented in part using a computerized device, such as a smartphone, handheld, or other computerized device.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A vehicle immobilization system comprising:

a detection unit operable to detect a level of an intoxicant in a user;

a control system configured to receive a signal from the detection unit indicating a level of intoxicant in the user, the control system comprising:

a control system housing configured to fit within a passenger compartment of a vehicle;

a processor disposed within the control system housing; and a wireless transmitter configured to transmit signals; and a wireless relay system, configured to be disposed in an engine compartment of the vehicle, the wireless relay system comprising:

a wireless relay housing;

a wireless receiver configured to receive the signals from the wireless transmitter;

a circuit control relay configured to be electrically connected to a vehicle relay location in an under-hood relay box in the engine compartment of the vehicle; and an interlock control relay configured to be electrically connected to the circuit control relay and the vehicle relay location, the interlock control relay configured to selectively allow a function of the vehicle based on the signals received by the wireless receiver.

2. The vehicle immobilization system of claim 1, the control system comprising an ignition input configured to be electrically connected to an ignition harness of the vehicle, the ignition input configured to provide an ignition status of the vehicle to the control system, wherein the ignition input is configured to be operatively connected to the ignition harness with an insulation displacement connector.

3. The vehicle immobilization system of claim 1, the control system comprising a power input, configured to be electrically connected to a constant power source in an in-cabin electrical system of the vehicle, the power input configured to deliver power to the control system from the constant power source, wherein the power input is configured to be operatively connected to the constant power source with a fuse tap.

4. The vehicle immobilization system of claim 1, the control system comprising a light output configured to be operatively connected to a hazard light circuit of the vehicle, the light output configured to control one or more lights of the vehicle, wherein the light output is operatively connected to the hazard light circuit with an insulation displacement connector.

5. The vehicle immobilization system of claim 1, wherein the wireless relay system further comprises a relay adaptor connector configured to connect the wireless relay system to the vehicle relay location in the under-hood relay box in the engine compartment of the vehicle, wherein the relay adaptor can be plugged into and removed from the vehicle relay location without damaging or modifying the vehicle relay location.

6. The vehicle immobilization system of claim 5, the relay adaptor connector comprising a plurality of electrical connectors, wherein each of the plurality of electrical connectors is configured to be electrically connected to one of a plurality of sockets of an original equipment manufacturer vehicle relay location in the under-hood relay box in the engine compartment of the vehicle.

7. The vehicle immobilization system of claim 5, wherein the wireless relay housing encloses the circuit control relay and the interlock control relay, wherein the wireless relay housing is configured to be disposed outside of the engine compartment relay box and is configured to be operatively connected to the engine compartment relay box with the relay adaptor connector.

8. The vehicle immobilization system of claim 1, the wireless relay system further comprising a horn control assembly comprising:

horn control relay disposed in the wireless relay housing and configured to activate a horn of the vehicle based on the signals received by wireless receiver; and a horn output, wherein the horn output is operatively connected to a horn circuit of the vehicle wherein the horn output is connected to the horn circuit of the vehicle at a fuse of the horn circuit, wherein the horn control assembly is configured to retain function of the horn fuse.

9. The vehicle immobilization system of claim 1, wherein the wireless transmitter and the wireless receiver are configured to operate in a frequency range of at least 260 MHz and not more than 929 MHz.

10. The vehicle immobilization system of claim 1, wherein the circuit control relay is configured to provide power to the interlock control relay when a circuit control relay switch is in a closed position.

11. The vehicle immobilization system of claim 1, wherein the wireless relay system comprises at least four electrical connectors configured to connect the wireless relay system to the vehicle relay location in the under-hood relay box in the engine compartment of the vehicle, wherein the circuit control relay is electrically connected to three of the at least four electrical connectors, and wherein the interlock control relay is electrically connected to two of the at least four electrical connectors.

12. The vehicle immobilization system of claim 1, the circuit control relay comprising a circuit control relay coil and a circuit control relay switch, and the interlock control relay comprising an interlock control relay coil and an interlock control relay switch.

13. The vehicle immobilization system of claim 12, wherein wireless relay system is configured so that current flows to a starter motor of the vehicle through the vehicle relay location only when the circuit control relay switch and the interlock control relay switch are closed, and wherein the interlock control relay coil selectively opens and closes the interlock control relay switch based on the signals received by the wireless receiver.

14. The vehicle immobilization system of claim 1, wherein the vehicle relay location is one of a vehicle starter relay location, a vehicle fuel pump relay location, a vehicle validation circuit relay location, a vehicle electric motor engagement relay, or a brake pedal engagement circuit relay location.

15. The vehicle immobilization system of claim 1, wherein the circuit control relay is physically separate from the interlock control relay.

16. The vehicle immobilization system of claim 1, the circuit control relay comprising a circuit control relay coil and a circuit control relay switch, the interlock control relay comprising an interlock control relay coil and an interlock control relay switch, wherein activating an ignition switch of the vehicle powers the circuit control relay coil and causes the circuit control relay to switch from an open position to a closed position, wherein the interlock control relay is configured to:

receive power at the interlock control relay coil via the circuit control relay when the circuit control relay switch is in the closed position; and selectively allow the function of the vehicle based on the signals received by the wireless receiver selectively closing the interlock control relay switch when the interlock control relay coil is powered via the circuit control relay.

17. A wireless relay system comprising:

a wireless relay housing configured to be disposed in an engine compartment of a vehicle and configured to be electrically connected to a vehicle relay location in an under-hood relay box in the engine compartment of the vehicle, the wireless relay housing enclosing:

a wireless receiver configured to receive signals from a wireless transmitter in a passenger compartment of the vehicle;

a circuit control relay comprising a circuit control relay actuation coil and a circuit control relay switch; and an interlock control relay configured to be electrically connected to the circuit control relay, the interlock control relay configured to selectively allow operation of the vehicle based on the signals received by the wireless receiver from the wireless transmitter.

18. The wireless relay system of claim 17, further comprising a relay adaptor connector configured to electrically connect the wireless relay housing to the vehicle relay location in the under-hood relay box in the engine compartment of the vehicle, wherein the relay adaptor can be plugged into and removed from the vehicle relay location without damaging or modifying the vehicle relay location, the relay adaptor connector comprising a plurality of electrical connectors, wherein each of the plurality of electrical connectors is configured to be electrically connected to one of a plurality of sockets of an original equipment manufacturer vehicle relay location in the under-hood relay box in the engine compartment of the vehicle.

19. The wireless relay system of claim 17, further comprising a horn control assembly comprising:

horn control relay disposed in the wireless relay housing and configured to activate a horn of the vehicle based on the signals received by wireless receiver; and a horn output, wherein the horn output is operatively connected to a horn circuit of the vehicle, wherein the horn output is connected to the horn circuit of the vehicle at a fuse of the horn circuit, wherein the horn control assembly is configured to retain function of the horn fuse.

20. A method of installing a vehicle immobilization system in a vehicle, the method comprising:

placing a control system in a passenger compartment of the vehicle, the control system comprising a wireless transmitter configured to transmit signals;

connecting the control system to a detection element such that the control system is configured to receive an input signal from the detection element indicating a level of intoxicant in a user;

removing an original equipment manufacturer vehicle relay from an original equipment manufacturer vehicle relay location in an under-hood relay box in an engine compartment of the vehicle;

providing a wireless relay system comprising a wireless relay housing, a circuit control relay within the wireless relay housing, an interlock control relay connected to the circuit control relay and within the wireless relay housing, and a wireless receiver connected to the interlock control relay and configured to receive the signals from the wireless transmitter;

electrically connecting the circuit control relay of the wireless relay system to portions of the original equipment manufacturer vehicle relay location in the under-hood relay box in the engine compartment of the vehicle; and electrically connecting the interlock control relay to portions of the original equipment manufacturer vehicle relay location in the under-hood relay box in the engine compartment of the vehicle.

* * * * *